(12) United States Patent
Kitazawa et al.

(10) Patent No.: US 9,205,576 B2
(45) Date of Patent: Dec. 8, 2015

(54) IMAGE FORMING OPTICAL SYSTEM, IMAGING APPARATUS, PROFILE MEASURING APPARATUS, STRUCTURE MANUFACTURING SYSTEM AND STRUCTURE MANUFACTURING METHOD

(71) Applicants: NIKON CORPORATION, Chiyoda-ku, Tokyo (JP); NIKON METROLOGY NV, Leuven (BE)

(72) Inventors: Daisuke Kitazawa, Chigasaki (JP); Patrick Blanckaert, Boortmeerbeek (BE)

(73) Assignee: NIKON CORPORATION, Tokyo (JP)

( * ) Notice: Subject to any disclaimer, the term of this patent is extended or adjusted under 35 U.S.C. 154(b) by 126 days.

(21) Appl. No.: 13/760,745

(22) Filed: Feb. 6, 2013

(65) Prior Publication Data

US 2013/0202727 A1 Aug. 8, 2013

Related U.S. Application Data

(60) Provisional application No. 61/735,709, filed on Dec. 11, 2012.

(30) Foreign Application Priority Data

Feb. 7, 2012 (JP) ................................. 2012-024108

(51) Int. Cl.
*G01B 11/24* (2006.01)
*B29C 37/00* (2006.01)
*G02B 27/00* (2006.01)
*G02B 13/24* (2006.01)

(52) U.S. Cl.
CPC ............... *B29C 37/00* (2013.01); *G01B 11/24* (2013.01); *G02B 13/24* (2013.01); *G02B 27/00* (2013.01); *G02B 27/0025* (2013.01)

(58) Field of Classification Search
CPC ..... G01B 11/24; G01B 11/0608; G01N 21/95; B29C 37/00; G02B 27/00
USPC .......... 356/601–623; 359/719, 708, 718, 710, 359/642
See application file for complete search history.

(56) References Cited

U.S. PATENT DOCUMENTS 5,090,811 A 2/1992 Donaldson
6,490,100 B1 12/2002 Sasano et al.
(Continued)

FOREIGN PATENT DOCUMENTS

WO  WO 2004/040335 A2  5/2004

OTHER PUBLICATIONS

PCT International Search Report of International Application No. PCT/JP2013/053441 dated Apr. 29, 2013 (3 pages).
(Continued)

*Primary Examiner* — Hoa Pham
(74) *Attorney, Agent, or Firm* — Finnegan, Henderson, Farabow, Garrett & Dunner, LLP

(57) ABSTRACT

There is provided a measuring apparatus including: an imaging optical system configured to form an image of an object to be measured; and an imaging section including a transmissive member which is arranged in the vicinity of an image plane of the imaging optical system to be inclined with respect an optical axis of the imaging optical system. The imaging optical system includes a first optical member which is non-coaxial with respect to the optical axis.

35 Claims, 37 Drawing Sheets

(56) References Cited

U.S. PATENT DOCUMENTS

| | | |
|---|---|---|
| 2002/0180988 A1* | 12/2002 | Johnston et al. ............... 356/602 |
| 2005/0053113 A1* | 3/2005 | Clary et al. ................... 372/108 |
| 2006/0009872 A1 | 1/2006 | Prager et al. |
| 2011/0304759 A1* | 12/2011 | Noda et al. ............... 348/333.01 |
| 2013/0128092 A1* | 5/2013 | Ogasahara et al. ........... 348/335 |

OTHER PUBLICATIONS

PCT Written Opinion of the International Searching Authority of International Application No. PCT/JP2013/053441 dated Apr. 29, 2013 (6 pages).

Notice of Reasons for Rejection issued in Japanese Patent Application No. 2014-555418, dated Jun. 16, 2015 (3 pages).

\* cited by examiner

Fig. 6

TABLE 1

| SURFACE NUMBER [-] | RADIUS OF CURVATURE [mm] | DISTANCE [mm] | REFRACT-IVE INDEX [-] | ABBE NUMBER [-] | EFFECTIVE DIAMETER [mm] | AMOUNT OF TILT [deg] |
|---|---|---|---|---|---|---|
| 0 | 0.00 | 85.00 | | | | 65 |
| 1 | 0.00 | 3.00 | 1.51432 | 64.10 | 13.21 | |
| 2 | 0.00 | 0.50 | | | 13.32 | |
| 3 | 83.63 | 5.00 | 1.81075 | 46.62 | 13.41 | |
| 4 | -65.09 | 0.10 | | | 13.31 | |
| 5 | 24.69 | 5.00 | 1.63673 | 60.09 | 12.10 | |
| 6 | 41.90 | 0.10 | | | 10.89 | |
| 7 | 13.79 | 7.00 | 1.60019 | 65.47 | 9.72 | |
| 8 | -173.46 | 1.75 | 1.77596 | 25.68 | 7.97 | |
| 9 | 8.42 | 3.15 | | | 5.74 | |
| 10 | 0.00 | 3.15 | | | | |
| 11 | -9.73 | 2.25 | 1.77596 | 25.68 | 5.69 | |
| 12 | 29.94 | 6.50 | 1.60019 | 65.47 | 7.73 | |
| 13 | -14.20 | 0.40 | | | 8.91 | |
| 14 | 48.34 | 5.20 | 1.72510 | 54.66 | 10.36 | 2.12 |
| 15 | -24.13 | 0.65 | | | 10.49 | |
| 16 | 13.79 | 4.00 | 1.89522 | 35.70 | 9.27 | -3.51 |
| 17 | 21.51 | 10.00 | | | 8.30 | |
| 18 | 0.00 | 0.55 | 1.51432 | 64.10 | 2.86 | -26.4 |
| 19 | 0.00 | 0.44 | | | | -26.4 |
| 20 | 0.00 | 0.00 | | | | -26.4 |

Fig. 12

TABLE 2

| SURFACE NUMBER [-] | RADIUS OF CURVATURE [mm] | DISTANCE [mm] | REFRACT- IVE INDEX [-] | ABBE NUMBER [-] | EFFECTIVE DIAMETER [mm] | AMOUNT OF TILT [deg] |
|---|---|---|---|---|---|---|
| 0 | 0.00 | 85.00 | | | | 65 |
| 1 | 0.00 | 3.00 | 1.51432 | 64.10 | 13.34 | |
| 2 | 0.00 | 0.50 | | | 13.45 | |
| 3 | 87.92 | 4.00 | 1.81075 | 46.62 | 13.64 | -2.62 |
| 4 | -60.93 | 0.50 | | | 13.62 | |
| 5 | 18.59 | 5.00 | 1.63673 | 60.09 | 11.91 | 3.15 |
| 6 | 37.69 | 0.50 | | | 10.76 | |
| 7 | 13.66 | 5.50 | 1.60019 | 65.47 | 9.26 | |
| 8 | 619.77 | 1.75 | 1.77596 | 25.68 | 7.91 | |
| 9 | 7.45 | 3.50 | | | 5.44 | |
| 10 | 0.00 | 2.80 | | | 5.13 | |
| 11 | -8.47 | 2.25 | 1.77596 | 25.68 | 5.36 | |
| 12 | 40.08 | 6.50 | 1.60019 | 65.47 | 7.49 | |
| 13 | -12.74 | 0.10 | | | 8.73 | |
| 14 | 42.18 | 5.20 | 1.72510 | 54.66 | 10.36 | |
| 15 | -25.31 | 0.10 | | | 10.47 | |
| 16 | 16.51 | 4.00 | 1.89522 | 35.70 | 9.31 | |
| 17 | 32.04 | 10.00 | | | 8.36 | |
| 18 | 0.00 | 0.55 | 1.51432 | 64.10 | 2.75 | -26.4 |
| 19 | 0.00 | 0.44 | | | 2.46 | -26.4 |
| 20 | 0.00 | 0.00 | | | | -26.4 |

Fig. 17

TABLE 3

| SURFACE NUMBER [-] | RADIUS OF CURVATURE [mm] | DISTANCE [mm] | REFRACT-IVE INDEX [-] | ABBE NUMBER [-] | EFFECTIVE DIAMETER [mm] | AMOUNT OF TILT [deg] |
|---|---|---|---|---|---|---|
| 0 | 0.00 | 85.00 | | | | 65 |
| 1 | 0.00 | 3.00 | 1.51432 | 64.10 | 13.45 | |
| 2 | 0.00 | 0.50 | | | 13.57 | |
| 3 | 62.19 | 3.50 | 1.81075 | 46.62 | 13.67 | 4.13 |
| 4 | 653.32 | 1.00 | | | 13.52 | |
| 5 | 25.62 | 5.50 | 1.63673 | 60.09 | 13.07 | |
| 6 | -252.41 | 0.50 | | | 12.61 | |
| 7 | 12.84 | 7.00 | 1.60019 | 65.47 | 9.72 | |
| 8 | -99.33 | 1.75 | 1.77596 | 25.68 | 8.06 | |
| 9 | 7.00 | 3.50 | | | 5.31 | |
| 10 | 0.00 | 2.80 | | | 4.97 | |
| 11 | -7.85 | 2.25 | 1.77596 | 25.68 | 5.29 | |
| 12 | -342.01 | 6.50 | 1.60019 | 65.47 | 7.40 | |
| 13 | -12.44 | 0.10 | | | 8.96 | |
| 14 | 49.11 | 5.00 | 1.72510 | 54.66 | 10.72 | |
| 15 | -26.06 | 0.10 | | | 10.85 | |
| 16 | 16.06 | 4.50 | 1.89522 | 35.70 | 9.74 | 1.25 |
| 17 | 33.73 | 10.00 | | | 8.69 | |
| 18 | 0.55 | 0.61 | 1.51432 | 64.10 | 2.79 | -26.4 |
| 19 | 0.44 | 0.49 | | | 2.49 | -26.4 |
| 20 | 0.00 | 0.00 | | | | -26.4 |

Fig. 22

TABLE 4

| SURFACE NUMBER [-] | RADIUS OF CURVATURE [mm] | DISTANCE [mm] | REFRACT- IVE INDEX [-] | ABBE NUMBER [-] | EFFECTIVE DIAMETER [mm] | AMOUNT OF TILT [deg] |
|---|---|---|---|---|---|---|
| 0 | 0.00 | 85.00 | | | | 65 |
| 1 | 0.00 | 3.00 | 1.51432 | 64.10 | 13.47 | |
| 2 | 0.00 | 1.00 | | | 13.59 | |
| 3 | 187.33 | 3.50 | 1.81075 | 46.62 | 13.61 | 5.50 |
| 4 | -161.86 | 1.00 | | | 13.55 | |
| 5 | 23.37 | 5.50 | 1.63673 | 60.09 | 13.22 | |
| 6 | -228.78 | 0.50 | | | 12.91 | |
| 7 | 12.70 | 7.00 | 1.60019 | 65.47 | 9.76 | 0.35 |
| 8 | -70.54 | 1.75 | 1.77596 | 25.68 | 8.26 | |
| 9 | 7.03 | 3.75 | | | 5.33 | |
| 10 | 0.00 | 2.80 | | | 5.04 | |
| 11 | -8.27 | 2.25 | 1.77596 | 25.68 | 5.23 | |
| 12 | 193.81 | 6.50 | 1.60019 | 65.47 | 7.10 | |
| 13 | -13.40 | 0.10 | | | 8.70 | |
| 14 | 47.63 | 5.00 | 1.72510 | 54.66 | 10.17 | |
| 15 | -26.91 | 0.10 | | | 10.33 | |
| 16 | 17.89 | 4.50 | 1.89522 | 35.70 | 9.55 | |
| 17 | 55.23 | 10.00 | | | 8.66 | |
| 18 | 0.00 | 0.55 | 1.51432 | 64.10 | 2.71 | -26.4 |
| 19 | 0.00 | 0.44 | | | 2.48 | -26.4 |
| 20 | 0.00 | 0.00 | | | | -26.4 |

Fig. 27

TABLE 5

| SURFACE NUMBER [-] | RADIUS OF CURVATURE [mm] | DISTANCE [mm] | REFRACT-IVE INDEX [-] | ABBE NUMBER [-] | EFFECTIVE DIAMETER [mm] | AMOUNT OF TILT [deg] |
|---|---|---|---|---|---|---|
| 0 | 0.00 | 85.00 | | | | 65 |
| 1 | 0.00 | 3.00 | 1.51432 | 64.10 | 13.40 | |
| 2 | 0.00 | 0.50 | | | 13.52 | |
| 3 | 70.46 | 3.50 | 1.81075 | 46.62 | 13.63 | |
| 4 | -188.01 | 1.00 | | | 13.53 | |
| 5 | 27.33 | 5.50 | 1.63673 | 60.09 | 12.77 | |
| 6 | 470.08 | 0.50 | | | 12.03 | |
| 7 | 14.16 | 7.00 | 1.60019 | 65.47 | 9.84 | |
| 8 | -146.73 | 1.75 | 1.77596 | 25.68 | 8.02 | -0.48 |
| 9 | 8.03 | 3.75 | | | 5.64 | |
| 10 | 0.00 | 2.80 | | | 5.30 | |
| 11 | -9.64 | 2.25 | 1.77596 | 25.68 | 5.49 | 0.90 |
| 12 | 126.40 | 6.50 | 1.60019 | 65.47 | 7.12 | |
| 13 | -15.48 | 0.10 | | | 8.74 | |
| 14 | 67.46 | 5.00 | 1.72510 | 54.66 | 10.11 | |
| 15 | -24.89 | 0.10 | | | 10.35 | |
| 16 | 16.11 | 4.50 | 1.89522 | 35.70 | 9.68 | |
| 17 | 43.80 | 10.00 | | | 8.82 | |
| 18 | 0.00 | 0.55 | 1.51432 | 64.10 | 2.91 | -26.4 |
| 19 | 0.00 | 0.44 | | | 2.61 | -26.4 |
| 20 | 0.00 | 0.00 | | | | -26.4 |

Fig. 32

TABLE 6

| SURFACE NUMBER [-] | RADIUS OF CURVATURE [mm] | DISTANCE [mm] | REFRACT- IVE INDEX [-] | ABBE NUMBER [-] | AMOUNT OF TILT [deg] |
|---|---|---|---|---|---|
| 0 | 0.00 | 85.00 | | | 65 |
| 1 | 0.00 | 3.00 | 1.51432 | 64.10 | |
| 2 | 0.00 | 0.50 | | | |
| 3 | 40.05 | 3.00 | 1.81075 | 46.62 | |
| 4 | 919.27 | 0.10 | | | |
| 5 | 27.43 | 5.00 | 1.63673 | 60.09 | |
| 6 | 120.16 | 0.10 | | | |
| 7 | 13.96 | 5.06 | 1.60019 | 65.47 | |
| 8 | 37.52 | 1.00 | 1.77596 | 25.68 | |
| 9 | 8.42 | 3.65 | | | |
| 10 | 0.00 | 3.50 | 1.77596 | 25.68 | |
| 11 | -8.66 | 1.10 | 1.60019 | 65.47 | |
| 12 | 36.99 | 5.08 | | | |
| 13 | -12.59 | 0.10 | | | |
| 14 | 88.18 | 7.02 | 1.72510 | 54.66 | |
| 15 | -20.50 | 3.79 | | | |
| 16 | 21.68 | 3.00 | 1.89522 | 35.70 | |
| 17 | 85.98 | 12.72 | | | |
| 18 | 0.00 | 0.55 | 1.51432 | 64.10 | -26.4 |
| 19 | 0.00 | 0.44 | | | -26.4 |
| 20 | 0.00 | 0.00 | | | -26.4 |

Focus [mm]

Focus [mm]

IMAGE FORMING OPTICAL SYSTEM, IMAGING APPARATUS, PROFILE MEASURING APPARATUS, STRUCTURE MANUFACTURING SYSTEM AND STRUCTURE MANUFACTURING METHOD

CROSS-REFERENCE TO RELATED APPLICATIONS

The present application claims priority from U.S. Provisional Patent Application No. 61/735,709 filed on Dec. 11, 2012 and claims priority from Japanese Patent Application No. 2012-024108 filed on Feb. 7, 2012, all the disclosures of which are incorporated herein by reference in their entirety.

BACKGROUND

1. Field of the Invention

The present invention relates to an image forming optical system, imaging apparatus, profile measuring apparatus, structure manufacturing system and structure manufacturing method.

2. Description of the Related Art

A tilted-lens image forming optical system is used in a projector, an imaging apparatus, a focusing apparatus provided with an imaging apparatus, a profile measuring apparatus provided with an imaging apparatus, etc. (see, for example, U.S. Pat. No. 5,090,811). For example, a profile measuring apparatus using the optical cutting method, etc. takes an image of an object onto which an illumination light is irradiated, and obtains an information regarding the profile of the object based on the imaging result. In the profile measuring apparatus, a direction in which the object irradiated with the illumination light is observed (imaged) is set to define an acute angle with respect to the light irradiation direction from which the illumination light is irradiated onto the object. Accordingly, an image forming optical system in the profile measuring apparatus is constructed, for example, as a tilted-lens image forming optical system which satisfies the Scheimpflug condition.

SUMMARY

According to an aspect of the present teaching, there is provided a measuring apparatus including:

an imaging optical system configured to form an image of an object to be measured; and an imaging section including a transmissive member which is arranged in the vicinity of an image plane of the imaging optical system to be inclined with respect an optical axis of the imaging optical system;

wherein the imaging optical system includes a first optical member which is non-coaxial with respect to the optical axis.

BRIEF DESCRIPTION OF THE DRAWINGS

FIG. 6 is Table 1 showing major items of the image forming optical system of the first embodiment.

FIG. 12 is Table 2 showing major items of the image forming optical system of the second embodiment.

FIG. 17 is Table 3 showing major items of the image forming optical system of the third embodiment.

FIG. 22 is Table 4 showing major items of the image forming optical system of the fourth embodiment.

FIG. 27 is Table 5 showing major items of the image forming optical system of the fifth embodiment.

FIG. 32 is Table 6 showing major items of the image forming optical system of the comparative example.

DESCRIPTION OF THE EMBODIMENTS

First Embodiment

Figure 1:
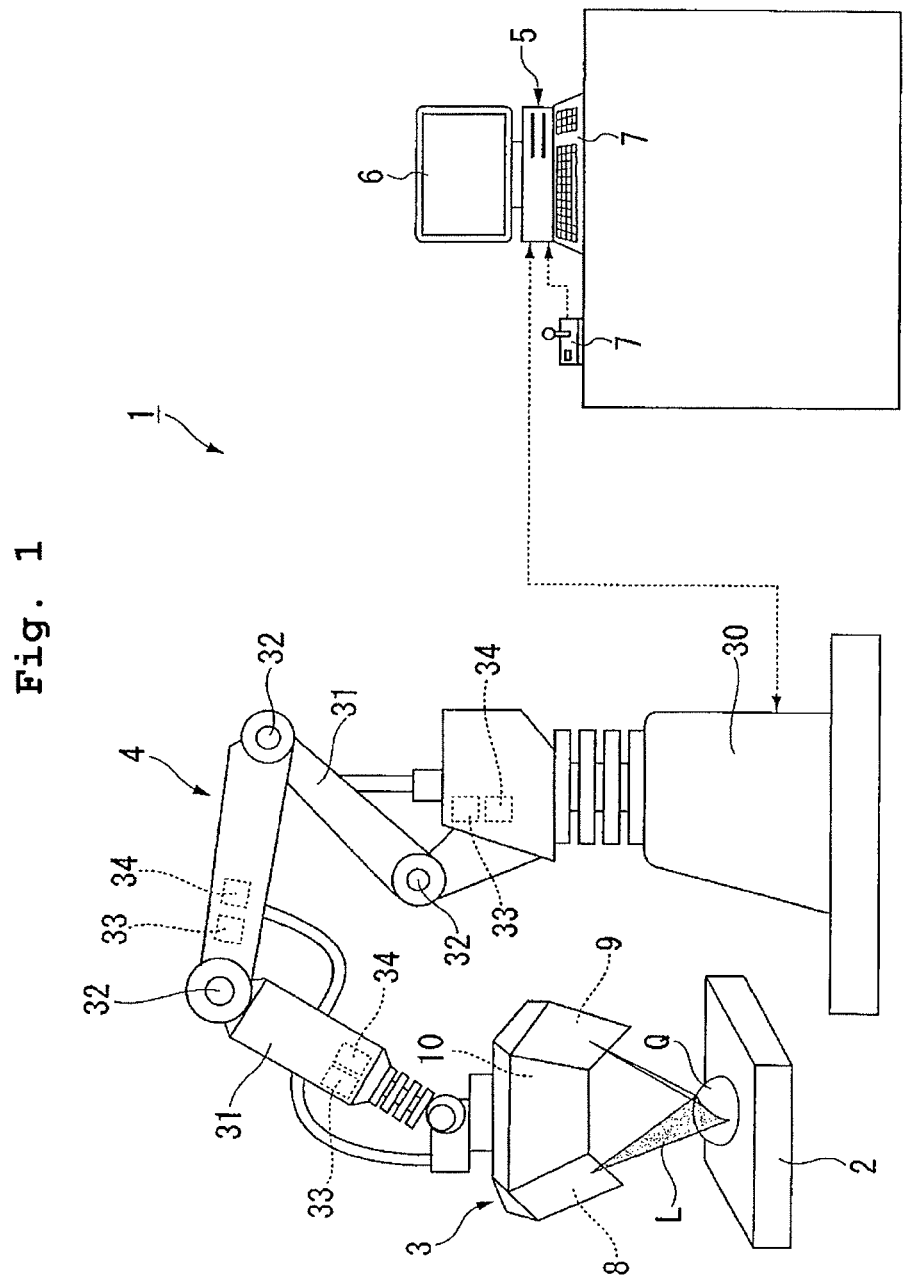
FIG. 1 is a view showing the overview of a profile measuring apparatus of a first embodiment of the present teaching.
Figure 2:
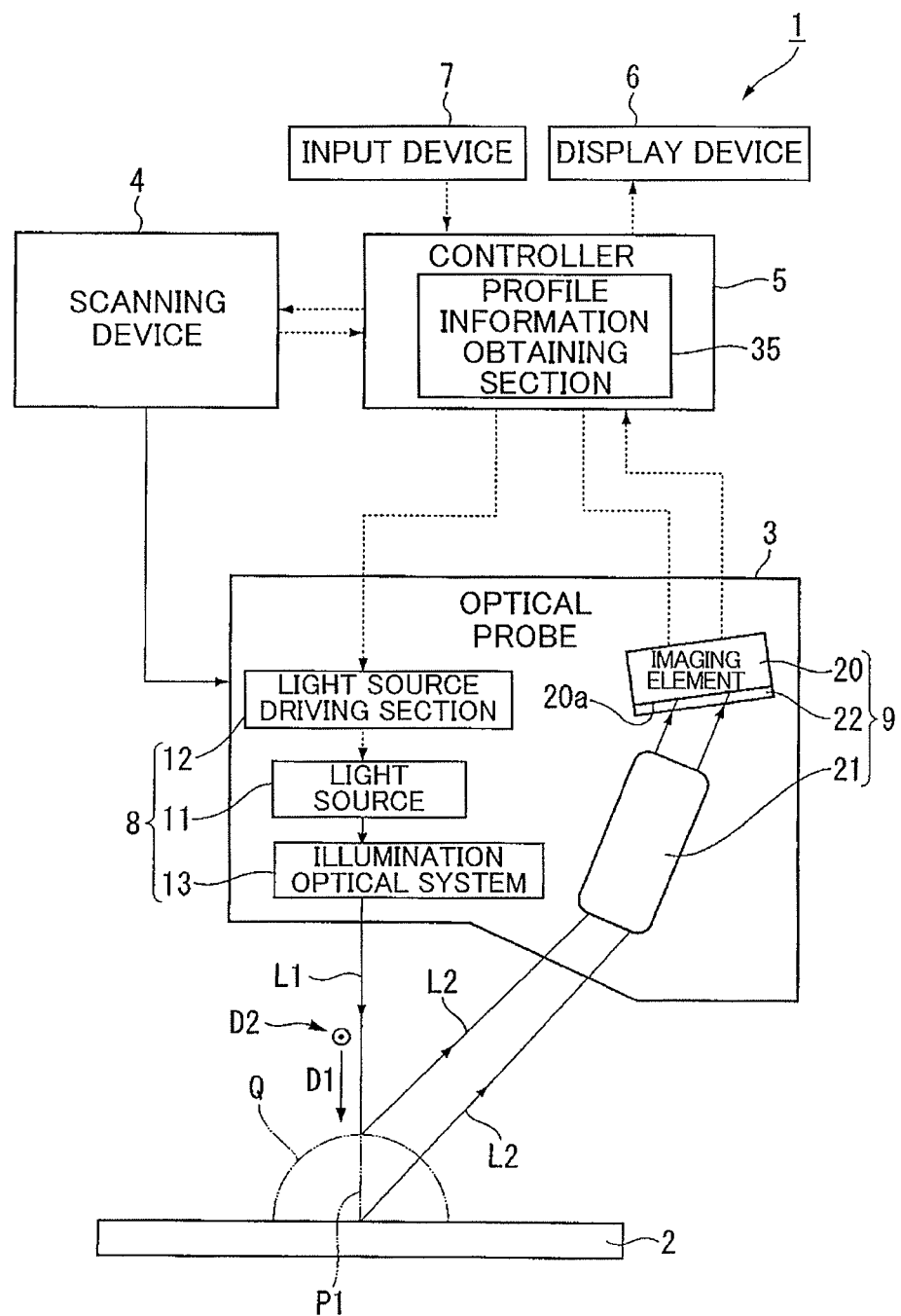
FIG. 2 is a view showing the configuration of the profile measuring apparatus of the first embodiment.
Figure 3:
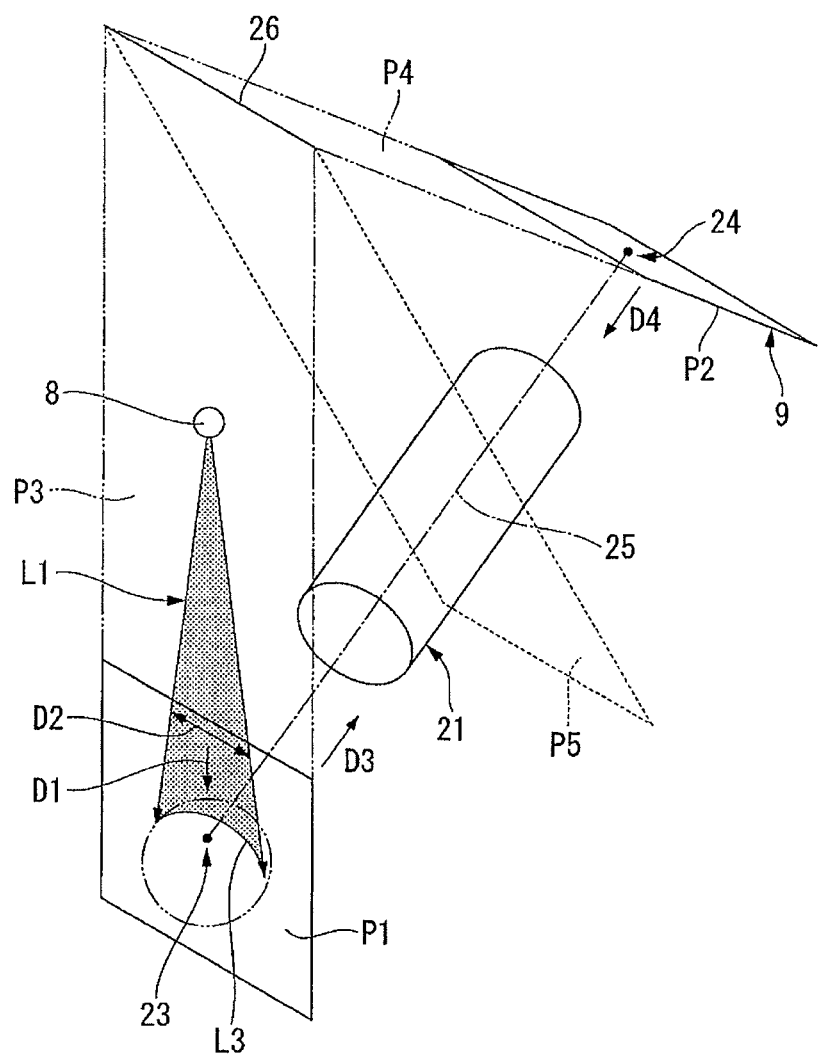
FIG. 3 is a view showing the positional relationship among the object plane, the image plane, etc. in an image forming optical system of the first embodiment.
Figure 4:
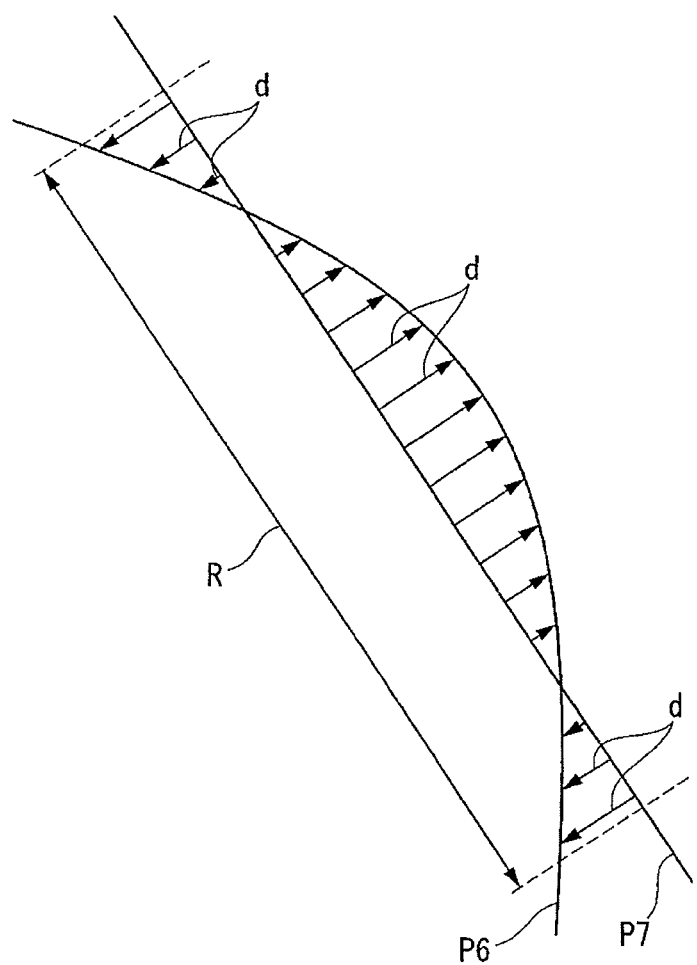
FIG. 4 is a view showing the definition of the average plane in the first embodiment.

In the following, a first embodiment will be explained with reference to the drawings. FIG. 1 is a view showing the overview of a profile measuring apparatus 1 of the first embodiment. FIG. 2 is a view showing the configuration of the profile measuring apparatus 1 of the first embodiment. FIG. 3 is a view showing the positional relationship among an object plane P1, an image plane P2, etc. in an image forming optical system 21 of the first embodiment. FIG. 4 is a view showing the definition of an average plane P7 in the first embodiment.

The profile measuring apparatus (profile measuring system) 1 shown in FIG. 1 is provided with a stage device 2, an optical probe 3, a scanning device 4, a controller 5, a display device 6 and an input device 7. The profile measuring apparatus 1 of the embodiment is capable of measuring the profile of an object to be measured Q (hereinafter referred to simply as "object Q") in a similar manner as a CMM (Coordinate Measuring Machine), an image measuring microscope, etc. The profile measuring apparatus 1 of the embodiment is capable of measuring the three-dimensional profile of the object Q, placed on the stage device 2, by the optical cutting method.

The stage device 2 holds the object Q such that the object Q does not move with respect to the stage device 2. The stage device 2 of the embodiment is fixed with respect to a placement area of the profile measuring apparatus 1. Note that the stage device 2 can be movable with respect to the optical probe 3 while holding the object Q thereon. Further, the stage device 2 can be an external device with respect to the profile measuring apparatus 1. For example, it is allowable that an object Q is transported on a manufacture line of a manufacturing system of the object Q (structure) and that the profile measuring apparatus 1 performs measurement for the object Q on the manufacture line. Further, it is also allowable that the profile measuring apparatus 1 performs measuring for an object Q placed on the ground, a table, etc. In such a case, the stage device 2 can be omitted.

The optical probe 3 is provided with a light source device 8 and an imaging device 9. The light source device 8 is controlled by the controller 5 to irradiate an illumination light onto a part of a surface of the object Q placed on the stage device 2. The imaging device 9 is controlled by the controller 5 to perform an imaging process for taking an image of the surface of the object Q irradiated with the illumination light. In the embodiment, the light source device 8 and the imaging device 9 are supported by a same support body 10. Each of the light source device 8 and the imaging device 9 is attached to the support body 10 to be exchangeable.

As shown in FIG. 2, the light source device 8 of the embodiment is provided with a light source 11 which emits light, a light source driving section 12 which drives the light source 11, and an illumination optical system 13. The light source device 8 irradiates the light emitted from the light source 11 onto the object Q via the illumination optical system 13. In the embodiment, the light which is emitted from the light source 11 and which travels via the illumination optical system 13 is referred to as the "illumination light".

The light source 11 of the embodiment includes a laser diode (solid light source). Namely, the illumination light exiting from the light source device 8 includes laser light (laser light beam). Note that the light source 11 can include a solid light source such as a light emitting diode (LED), a super luminescent diode, etc., other than the laser diode. The light source driving section 12 is controlled by the controller 5 to supply, to the light source 11, electric power necessary for the light emission by the light source 11.

The illumination optical system 13 adjusts the spatial light intensity distribution of the light emitted from the light source 11. The illumination optical system 13 of the embodiment includes a cylindrical lens. The illumination optical system 13 can be a single optical member, or can include a plurality of optical members. The spot of the light, emitted from the light source 11, is spread in a direction in which the cylindrical lens has a positive power, and is allowed to exit from the light source device 8. As shown in FIG. 1, the illumination light (hereinafter referred to as "line light L1") becomes a light with a line-shaped intensity distribution of which spot, in a plane which is orthogonal to the light exiting direction from the light source device 8, has a shape with longitudinal and short directions.

Note that it is also allowable to adjust, by using a diffractive optical element in the illumination optical system 13, the spatial light intensity distribution of the light emitted from the light source 11. It is possible to use a variety of kinds of existing elements as the diffractive optical element; it is allowable, for example, to construct a diffractive optical element with a Computer Generated Hologram (CGH). Further, in the embodiment, a light of which spatial light intensity distribution is adjusted is referred also to as "pattern light" in some cases. The line light L1 is an example of such a pattern light.

The imaging device 9 of the embodiment is provided with an imaging element 20, an imaging optical system 21 and a cover member 22. The line light L1 irradiated from the light source device 8 onto the object Q is reflected and scattered on the surface of the object Q, and at least a portion of the line light L1 comes into the image forming optical system 21. In the imaging device 9, the light coming into the image forming optical system 21 from the light source device 8 via the surface of the object Q (hereinafter referred to as "image forming light flux L2") is detected by the imaging element 20 via the image forming optical system 21 and the cover member 22. The image forming light flux L2 includes at least a part or portion of a light flux included in the light flux exiting from the light source device 8 and coming into the image forming optical system 21 via the surface of the object Q. In the embodiment, the controller 5 controls the imaging timing, etc., of the imaging element 20, and/or the like.

The imaging element 20 is, for example, a CCD image sensor, CMOS image sensor, etc. The imaging element 20 includes, for example, a plurality of pixels arranged (aligned) two-dimensionally in a light receiving surface. Each of the plurality of pixels includes a light receiving element such as a photodiode, etc. Each of the photodiodes generates electric charge depending on the light amount of the incident light. The imaging element 20 is capable of detecting the light amount distribution of the light coming into the light receiving surface by reading, with the CCD, etc., the electric charge generated in each of the pixels.

As shown in FIG. 3, the image forming optical system 21 forms the image plane P2 conjugate with the object plane P1 on the light receiving surface of the imaging element 20. In this embodiment, the object plane P1 is a part or portion of a plane P3 including a propagating direction (exiting direction)

D1 in which the line light L1 from the light source device 8 propagates and a longitudinal direction D2 of the spot of the line light L1. In the embodiment, the center of the object plane P1 is referred to as a first center 23, and the center of the image plane P2 is referred to as a second center 24. In the embodiment, the center of the image plane P2 is the central position at an area in which an image is formed by the image forming optical system 21, and the center of the object plane P1 is the position conjugate with the center of the image plane P2 in the image forming optical system 21. Further, an axis connecting the first center 23 and the second center 24 is referred to as a first axis 25, and an axis on the intersection line connecting a plane P3 including the object plane P1 and a plane 4 including the image plane P2 is referred to as a second axis 26. Furthermore, a plane orthogonal to the first axis 25 between the object plane P1 and the image plane p2 is referred to as a first plane P5.

Note that the first axis 25 is not limited only to an axis passing through the center of the object plane P1 and the center of the image plane P2. The first axis 25 can be an axis passing through an arbitrary point in the object plane P1 and an arbitrary point in the image plane P2. The first axis can be set in any way, provided that it is possible to appreciate whether each of optical members is inclined in the clockwise direction or in the counterclockwise direction.

Further, the first axis 25 can also be set in the following manners: a point in the image plane within a pixel area, which is included in a pixel signal outputted from the imaging element 20 and which is used as image data, is selected as the one point of the first axis 25 in the image plane; then, a point in the object plane, which is in a conjugate relationship with the one point of the image plane selected by the image forming optical system 21, is selected as the one point of the first axis 25 in the object plane. By connecting the selected one point in the image plane and the selected one point in the object plane, the first axis 25 is set. Otherwise, the first axis also be set in optical axes of lenses consisting the image forming optical system without a decentered lens element.

In the embodiment, each of the object plane P1 and the image plane P2 is inclined with respect to the first axis 25 in a plane including the first axis 25 and perpendicular to the second axis 26. The direction in which the object plane P1 is inclined (falls) with respect to the first axis 25 (hereinafter referred to as "first direction D3") is oriented oppositely to the direction in which the image plane P2 is inclined with respect to the first axis 25 (hereinafter referred to as "second direction D4"). The object plane P1 is inclined with respect to the first axis 25 so that the object plane P1 is closer to the first plane P5 as approaching closer to the second axis 26. The image plane P2 is inclined with respect to the first axis 25 so that the image plane P2 is closer to the first plane P5 from the opposite side to that regarding the object plane P1.

Note that one or both of the object plane P1 and the image plane P2 can include a curved plane. For example, in a case that the object plane P1 includes a curved plane, the positional relationship indicating the inclination, etc. of the object plane P1 with respect to various kinds of axes, etc. can be set by using an average plane P7 (see FIG. 4) corresponding to the object plane P1. It is matter of course that an average plane can be defined for the image plane in a similar manner as regarding the object plane. Accordingly, in a case of discussing as to in which directions the object plane and the image plane are inclined as in the present teaching, it is possible to make evaluation by using such an average plane. In FIG. 4, reference numeral "P6" denotes a curved plane, and reference numeral "R" denotes an area which is included in the curved plane P6 and in which the image forming light flux L2 which forms an image in the image plane P2 passes (hereinafter referred to as "effective diameter R"). In the embodiment, the average plane P7 is a plane in which the root-mean square (RMS) of a distance "d", between each of the points on the average plane P7 in the effective diameter R and the curved plane P6, becomes minimum.

The image forming optical system 21 of the embodiment forms, in the light receiving surface of the imaging element 20, an image of a pattern L3 which is drawn on the object Q by the line light L1 irradiated from the light source device 8 onto the object Q. The configuration of the image forming optical system 21 will be described later on.

In the embodiment, the light exiting from the light source device 8 and reflected and scattered at one point on the object Q passes through the image forming optical system 21 to thereby be condensed or focused substantially at one point on the light receiving surface of the imaging element 20. Namely, there is consequently a one-to-one correspondence between each of the respective points of the image formed on the imaging element 20 and one of the respective points on the line (pattern L3) in which the object plane P1 of the image forming optical system 21 and the object Q intersect. As described above, an information showing the imaging result of the imaging device 9 includes an information showing the position of each of the points on the surface of the object Q.

As shown in FIG. 2, the cover member 22 of the embodiment is arranged on an optical path between an optical member included in the image forming optical system 21 and located closest to the image plane P2 and the light receiving surface (image plane P2) of the imaging element 20. In the embodiment, the cover member 22 is a plate-shaped member (parallel plate) and is made of, for example, a material such as quartz, glass, etc., through which at least a part or portion of the image forming light flux L2 is transmissible. The cover member 22 of the embodiment is arranged so as to cover a surface 20a, of the imaging element 20, which is oriented to face the image forming optical system 21. A surface of the cover member 22 is brought into contact with the imaging element 20. The cover member 22 suppresses any entering of dust, etc., to the surface 20a of the imaging element 20.

In the embodiment, the surface of the cover member 22 is substantially parallel to the image plane P2 of the image forming optical system 22 (light receiving surface of the imaging element 20). The image forming light flux L2 exiting from the image forming optical system 21 comes into the cover member 22 from a non-normal direction with respect to the cover member 22. The image forming light flux L2 coming into the cover member 22 passes through the cover member 22 and comes into the light receiving surface of the imaging element 20 from a non-normal direction with respect to the light receiving surface.

The scanning device (scanning section) 4 shown in FIG. 1 is capable of changing the relative positions between the stage device 2 and the optical probe 3. Namely, the scanning device 4 is capable of changing the relative positions between the object Q on the stage device 2 and the optical probe 3. The scanning device 4 of the embodiment holds the optical probe 3 to be interchangeably, and moves the optical probe 3 relative to the stage device 2 fixed at the placement area of the profile measuring apparatus 1. The line light L1 exiting from the light source device 8 of the optical probe 3 scans the surface of the object Q as the scanning device 4 moves the optical probe 3.

The scanning device 4 of the embodiment is provided with a base 30, a plurality of arm sections 31, a plurality of joint sections (connection sections) 32, a plurality of scanning driving section 33, and detectors 34.

The base 30 of the embodiment is fixed at the placement area of the profile measuring apparatus 1, and the relative position of the base 30 relative to the stage device 2 is fixed. The plurality of arm section 31 are connected to each other via the joint sections 32. The plurality of arm sections 31 connected to each other has an end portion (base end portion) connected to the base 30 and the other end portion (distal or tip end portion) connected to the optical probe 3.

Each of the scanning driving sections 33 is attached to the inside or outside of the arm section 31, etc. The scanning driving section 33 includes, for example, an actuator such as an electric motor. The scanning driving sections 33 are capable of changing the relative positions between a pair of the arm sections 31 connected to each other by the joint section 32. Each of the detectors 34 is, for example, an encoder, and detects a moving amount of the arm section 31 moved by the scanning driving section 33.

The scanning device 4 of the embodiment is controlled by the controller 5. The controller 5 controls the scanning driving sections 33 of the scanning device 4 to thereby control at least one of the positions and the posture of the optical probe 3. Further, the controller 5 obtains positional information of the optical probe 3 from the detectors 34 of the scanning device 4. The positional information of the optical probe 3 includes at least one of information showing the position of the optical probe 3 and information showing the posture of the optical probe 3. Note that the profile measuring apparatus 1 can be provided with a measuring device (for example, a laser interferometer) which measures at least one of the position and the posture of the optical probe 3, and the controller 5 can obtain the positional information of the optical probe 3 from this measuring device.

The input device 7 is constructed, for example, of various kinds of input devices such as a keyboard, a mouse, a joystick, a trackball, a touchpad, etc. The input device 7 receives input of various kinds of information to the controller 5. The various kinds of information include, for example, an instruction information showing instruction (command) for allowing the profile measuring apparatus 1 to start measurement, a setting information regarding setting made by the profile measuring apparatus 1, an operation information for manually operating at least a part or portion of the profile measuring apparatus 1, etc.

The display device 6 is constructed, for example, of a liquid crystal display device, an organic electro-luminescence display device, etc. The display device 6 displays a measurement information regarding the measurement of the profile measuring apparatus 1. The measurement information includes, for example, a setting information showing the setting regarding measurement, a process step and progress status information showing the progress of measurement, a profile information showing the measurement result, etc. The controller 5 supplies an image data showing the measurement information to the display device 6 of the embodiment, and the display device 6 shows an image showing the measurement information in accordance with the image data.

The controller 5 of the embodiment controls the respective parts or components of the profile measuring apparatus 1 as follows. The controller 5 controls a timing at which the light source 11 of the light source device 8 emits light, the output (light amount) of the light source 11, etc. The controller 5 controls the scanning device 4 so that the illumination light (line light L1) exiting from the light source device 8 scans the surface of the object Q. The controller 5 allows the imaging device 9 to take a plurality of frames of images during a period of time in which a portion, of the surface of the object Q, that is irradiated with the line light L1 from the light source device 8 is changed over time.

Further, the controller 5 of the embodiment is provided with a profile information obtaining section 35 which obtains information regarding the profile or shape of the object. The profile information obtaining section 35 obtains imaging result (image data) by the imaging device 9, and obtains the information regarding the profile of the object Q based on the imaging result. The controller 5 of the embodiment supplies, to the display device 6, the image data showing the measurement information regarding the measurement of the profile measuring apparatus 1, and the controller 5 allows the display device 6 to display the image showing the measurement information thereon. For example, the controller 5 visualizes the measurement result (profile information) regarding the profile of the object Q and allows the image showing the measurement result to be displayed on the display device 6.

With respect to an optical apparatus of a conventional or ordinary profile measuring apparatus, etc., in a case that the image plane of the image forming optical system is inclined with respect to the object plane, a marginal light which is included in an imaging light flux converging to a point on the image plane comes into the image plane asymmetrically, which in turn tends to cause the aberration about an axis perpendicular to the image plane to be non-axisymmetric. For example, in a case that a member such as a cover glass (parallel transparent plate) is arranged between the image forming optical system and the image plane, aberration which is asymmetric with respect to the above-described axis (for example, astigmatism, coma aberration, etc.) is generated in the cover glass on the plane including the normal direction in the center of the object plane and the normal direction in the center of the image plane. Accordingly, the light flux included in the imaging light flux and exiting from one point on the object plane (hereinafter referred to as "partial light flux) tends to have a shape of spot thereof on the image plane that is non-axisymmetric about the axis perpendicular to the image plane. In such a case, the peak position of the brightness distribution detected by the imaging element is shifted by an amount or extent corresponding to the non-axisymmetric aberration, and thus the position of the surface of the object is detected as being shifted from the actual position of the surface, which in turn results in the lowering of measurement accuracy.

Next, an explanation will be made about the image forming optical system 21 of the embodiment. The image forming optical system 21 of the embodiment is configured so as to cancel at least a part or portion of aberration component which is included in the aberration generated in the cover member 22 and which is non-axisymmetric about the axis perpendicular to the image plane P2, in particular to cancel the aberration of the non-axisymmetric component by allowing a lens constructing the image forming optical system 21 to be non-coaxial or off-center.

Note that in the respective embodiments, the term "non-coaxial" includes one or both of the following concepts that a lens is inclined (tilted) with respect to the first axis, and that the symmetry axis of a certain lens is moved or shifted without changing the direction of the symmetry axis of the certain lens with respect to the symmetry axes of a plurality of other lenses different from the certain lens. In the following, a case that only a certain lens or lenses is/are inclined in particular with respect to the first axis or the optical axis will be explained as an example, but there is no limitation only to this. Further, by allowing a part of the optical members constructing the image forming optical system 21 to be non-coaxial as described above, the aberration generated in the image forming optical system 21 can cancel at least a part of the above-described non-axisymmetric component (aberration). The image forming optical system 21 of the embodiment is provided with an optical member as will be explained below and thus is capable of, for example, suppressing the occurrence of non-axisymmetric aberration, etc. Note that although the optical axis and the first axis are arranged on a same side in the respective embodiments, the present teaching is not limited to such an arrangement. Further, it is needless to say that the term "optical axis" described herein is an axis aligning the symmetry axes of the respective optical lenses which are not non-coaxial in the imaging optical system. In the following, explanation will be given as the inclination angle with respect to the first axis.

Figure 5:
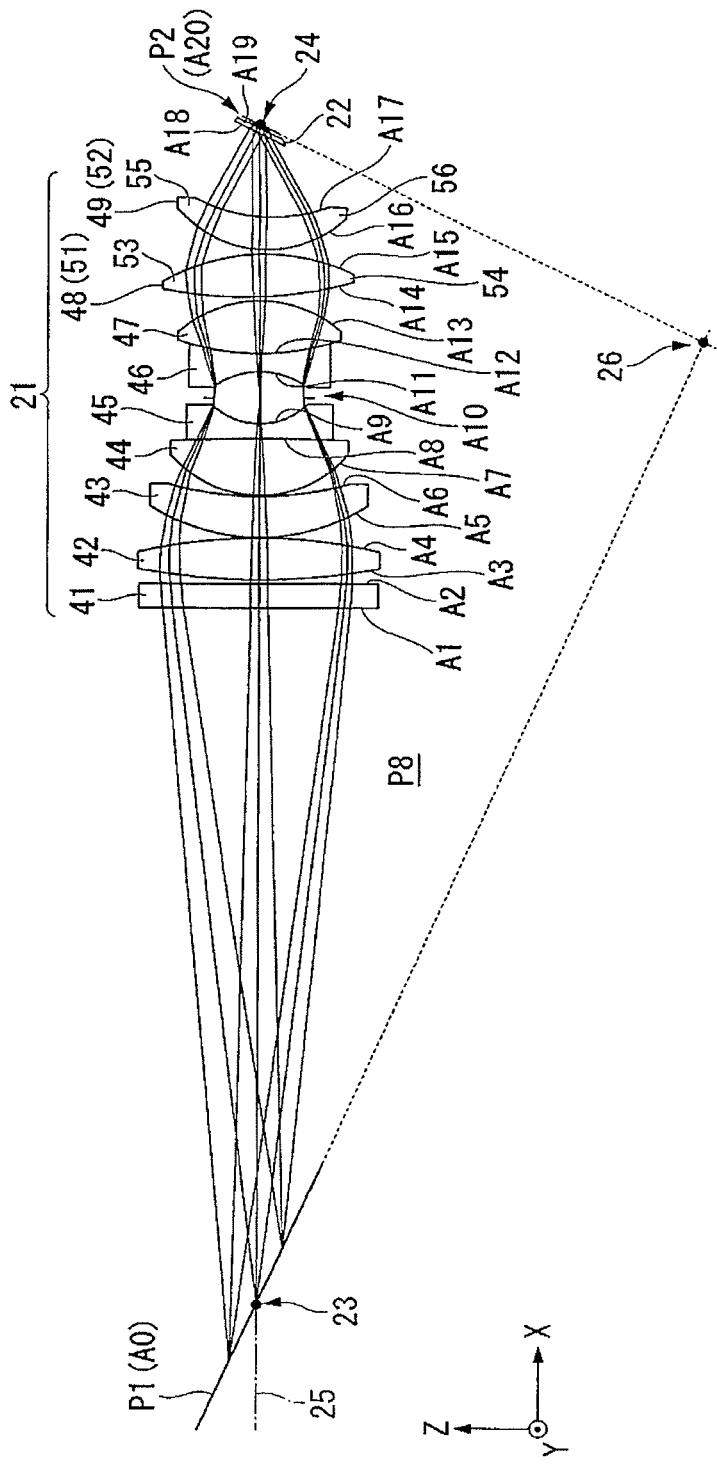
FIG. 5 is a view showing the configuration of the image forming optical system of the first embodiment.

FIG. 5 is a view showing the configuration of the image forming optical system 21 of the embodiment. FIG. 6 is a Table 1 showing the major items of the image forming optical system 21 of the embodiment. A unit of length regarding Radius of curvature "r", interplanar distance "d", and other items are [mm] unless otherwise specifically indicated. However, in optical systems, similar optical characteristic can be obtained even with the case of optical systems of proportional magnification or proportional reduction system, and thus the unit of length is not limited to [mm] and any other suitable units can also be used.

Note that in the following, explanation will be made with reference to an XYZ orthogonal coordinate system as shown in FIG. 5, etc., in some cases in order to explain the positional relationship among the constitutive components or parts of the image forming optical system 21. In the XYZ orthogonal coordinate system, X-axis direction is a direction parallel to the first axis 25, Y-axis direction is a direction parallel to the second axis 26, and Z-axis direction is orthogonal to both of the X-axis and Y-axis directions.

Further, explanation will be made in some cases while corresponding the respective optical surfaces of the image forming optical system 21 to surface numbers. For example, the surface numbers in Table 1 shown in FIG. 6 are numbered in ascending order, with the object plane P1 as a starting point (surface No. 0), such that the surface number of an optical surface is increased as the optical surface is located closer from the object plane P1 to the image plane P2 shown in FIG. 5. For example, the first optical surface corresponding to the surface number 1 is an optical surface arranged next to the object plane P1. Regarding an integer "n" which is not less than 0, reference numeral "An" is designated to denote a n-th optical surface such that the first optical surface is designated with reference numeral "A1", and the second optical surface is designated with reference numeral "A2", etc.

Note that in the table showing the major items of the image forming optical system 21 (for example, Table 1 of FIG. 6), regarding an optical surface which can be considered as substantially a flat surface, such an optical surface is indicated with the "curvature (0.00)", instead of with the "radius of curvature". Further, the "distance" of the n-th optical surface An indicates a distance from the n-th optical surface An to another optical surface which is next closer to the object plane P1 with respect to the n-th optical surface An. For example, the "distance" with respect to the 0 optical surface A0 (object plane P1) shows the distance from the object plane P1 to the first optical surface A1. Further, the "distance" with respect to the first optical surface A1 shows the distance from the first optical surface A1 to the second optical surface A2, thus corresponding to the thickness of an optical member having the first and second optical surfaces A1 and A2. Further, the "refractive index" and "Abbe number" of the n-th optical surface An show the refractive index and the Abbe number of an optical member having the n-th optical surface An. The refractive index is a value with respect to a light of which wavelength is 656.273 nm. Further, the Abbe number is a value of vd. Furthermore, the "amount of tilt" of the n-th optical surface An shows an angle [deg] defined by the central axis or the optical axis of the n-th optical surface An with the X-axis direction. This angle is a negative angle when clockwise about the axis parallel to the Y-axis direction, and is a positive angle when counter-clockwise about the axis parallel to the Y-axis direction. Namely, in a case that the amount of tilt of an optical member is positive, the optical member is inclined with respect to the first axis 25 in an opposite direction to the direction in which the image plane P2 is inclined with respect to the first axis 25; and in a case that the amount of tilt of an optical member is negative, the optical member is inclined with respect to the first axis 25 in a same direction as the direction in which the image plane P2 is inclined with respect to the first axis 25.

Note that the direction of inclination can be defined as follows. Namely, the second to ninth lenses 42 to 49 all have a curved surface shape which is rotationally symmetric about a predetermined axis. The direction of inclination can be defined based on whether the predetermined axis is rotated counter-clockwise with respect to the first axis 25 or rotated clockwise with respect to the first axis 25. This is applied similarly also to other embodiments to be described later on.

In the embodiment, the first axis 25 passes the first center 23 of the object plane P1 and is parallel to the X-axis direction. As shown in FIG. 5, the object plane P1 is inclined with respect to the first axis 25 so as to inclined from the −X side to the +X side if a center is in the first center 23 as approaching from the +Z side to the −Z side. In the embodiment, the image plane P2 is inclined with respect to the first axis 25 so as to inclined from the +X side to the −X side if a center is in the second center 24 as approaching from the +Z side to the −Z side. In such a manner, the object plane P1 and the image plane P2 are inclined in mutually opposite directions with respect to the first axis 25. For example, the object plane P1 is inclined at approximately 65 degrees from a plane orthogonal to the first axis 25 (YZ plane); and the image plane P2 is inclined at approximately −26.4 degrees from the plane orthogonal to the first axis 25 (YZ plane). For example, the image forming optical system 21 has the image-side numerical aperture (NA) that is 0.48, and the focal distance "f" that is 32.2 mm. The object plane P1 is, for example, a rectangular-shaped area of which size is 15 mm×15 mm.

The image forming optical system 21 of the embodiment is provided with a first cover glass 41 and second to ninth lenses (optical members) 42 to 49. The first cover glass 41 and the second to ninth lenses are made by transmissive material, which at least light emitted from the right source 11. The second to ninth lenses 42 to 49 are arranged along the first axis 25. In the embodiment, each of the second to ninth lenses 42 to 49 is a so-called spherical lens. Each of the second to seventh lenses 42 to 47 is axisymmetric about the first axis 25 within a range in which the image forming light flux L2 passes. The eighth lens 48 (hereinafter referred to as "first optical member 51") is inclined with respect to the first axis 25 in a direction opposite to the direction in which the image plane P2 is inclined with respect to the first axis 25. The ninth lens 49 (hereinafter referred to as "second optical member 52") is inclined with respect to the first axis 25 in a direction same as the direction in which the image plane P2 is inclined with respect to the first axis 25.

In the embodiment, the first cover glass 41 has the first optical surface A1 facing the side of the object plane P1 and the second optical surface A2 facing the side of the image plane P2. The first cover glass 41 is transmissive to at least light emitted from the optical source 11. As shown in Table 1 of FIG. 6, each of the first and second optical surfaces A1 and A2 has the curvature of 0 and is a parallel plate.

In the embodiment, the second lens 42 has a third optical surface A3 facing the side of the object plane P1 and a fourth optical surface A4 facing the side of the image plane P2. The second lens 42 is a so-called biconvex lens in which the third optical surface A3 is convex toward the object plane P1 (the radius of curvature is positive) and the fourth optical surface A4 is convex toward the image plane P2 (the radius of curvature is negative).

In the embodiment, the third lens 43 has a fifth optical surface A5 facing the side of the object plane P1 and a sixth optical surface A6 facing the side of the image plane P2. The third lens 43 is a so-called meniscus lens in which the fifth optical surface A5 is convex toward the object plane P1 and the sixth optical surface A6 is concave toward the image plane P2 (the radius of curvature is positive). The third lens 43 is arranged adjacent and close to the second lens 42 to such an extent that the fifth optical surface A5 is substantially brought into contact with the fourth optical surface A4 of the second lens 42.

In the embodiment, the fourth lens 44 has a seventh optical surface A7 facing the side of the object plane P1. The fourth lens 44 substantially has a shape of a substantially plano-convex lens in which the seventh optical surface A7 is convex toward the object plane P1. The fourth lens 44 is arranged adjacent and close to the third lens 43 to such an extent that the seventh optical surface A7 is substantially brought into contact with the sixth optical surface A6 of the third lens 43.

In the embodiment, the fifth lens 45 has an eighth optical surface A8 facing the side of the object plane P1 and a ninth optical surface A9 facing the side of the image plane P2. The fifth lens 45 is a so-called biconcave lens in which the eighth optical surface A8 is concave toward the object plane P1 (the radius of curvature is negative) and the ninth optical surface A9 is concave toward the image plane P2. The fifth lens 45 is arranged adjacent and close to the fourth lens 44 to such an extent that the eighth optical surface A8 is substantially brought into contact with the fourth lens 44.

In the embodiment, the sixth lens 46 has an eleventh optical surface A11 facing the side of the object plane P1 and a twelfth optical surface A12 facing the side of the image plane P2. The sixth lens 46 is a so-called biconcave lens in which the eleventh optical surface A11 is concave toward the object plane P1 and the twelfth optical surface A12 is concave toward the image plane P2. In the embodiment, the tenth optical surface A10 is an aperture stop of the image forming optical system 21. The tenth optical surface A10 is arranged between the fifth and sixth lenses 45 and 46. The tenth optical surface A10 is substantially orthogonal to the first axis 25.

In the embodiment, the seventh lens 47 has a thirteenth optical surface A13 facing the side of the image plane P2. The seventh lens 47 substantially has a shape of a biconvex lens in which the thirteenth optical surface A13 is convex toward the image plane P2. The seventh lens 47 is arranged adjacent and close to the sixth lens 46 to such an extent that the seventh lens 47 is substantially brought into contact with the twelfth optical surface A12 of the sixth lens 46.

In the embodiment, the first optical member 51 (eighth lens 48) is arranged on the side of the image plane P2 with respect to the tenth optical surface (the aperture stop). The first optical member 51 is arranged to be separate and away from the aperture stop so that another optical member (for example, the sixth lens 46 and the seventh lens 47) is interposed or sandwiched between the aperture stop and the first optical member 51.

The first optical member 51 has a fourteenth optical surface A14 facing the side of the object plane P1 and a fifteenth optical surface A15 facing the side of the image plane P2. The first optical member 51 is a so-called biconvex lens in which the fourteenth optical surface A14 is convex toward the object plane P1 and the fifteenth optical surface A15 is convex toward the image plane P2. The first optical member 51 has a power with respect to the image forming light flux L2. The fourteenth optical surface A14, of the first optical member 51, which faces the side of the object plane P1 has a curvature that is relatively small (radius of curvature that is relatively large) among the optical surfaces in the image forming optical system 21. The first optical member 51 has the power smaller at least than the average value of the powers of the optical surfaces of the respective second to ninth lenses. In the embodiment, the first optical member 51 does not include an optical surface of which radius of curvature is smallest among the optical members of the image forming optical system 21. In the embodiment, the fourteenth optical surface A14 via which the image forming light flux L2 comes into the first optical member 51 has the curvature that is smaller than the curvature of the fifteenth optical surface A15 via which the image forming light flux L2 exits from the first optical member 51.

In the embodiment, the first optical member 51 is inclined with respect to the first axis 25 in the opposite direction opposite to the direction in which the image plane P2 is inclined with respect to the first axis 25. The first optical member 51 is provided with a first portion 53 arranged on a first side (for example, +Z side) with respect to the first axis 25 and a second portion 54 arranged on a second side (for example, −Z side) with respect to the first axis 25. In the embodiment, the object plane P1 and the image plane P2 are inclined with respect to the first axis 25 so that the object plane P1 and the image plane P2 are closer to each other as approaching closer to the second side (−Z side). Accordingly, the intersection line of the object plane P1 and the image plane P2 (second axis 26) is arranged on the second side (−Z side) with respect to the first axis 25. As described above, the second portion 54 of the first optical member 51 is a portion closer to the second axis 26 than the first portion 53. The principal plane of the first optical member 51 is arranged to be closer to the image plane P2 in a direction from the first portion 53 to the second portion 54. In the embodiment, the center axis of the first optical member 51 is inclined at approximately 2.12 degrees with respect to the first axis 25, as shown in Table 1 of FIG. 6.

In the embodiment, a surface of the cover member 22 which faces the side of the object plane P1 (eighteenth optical surface A18) is substantially parallel to the image plane P2. Since the image forming light flux L2 comes into the cover member 22 in the non-vertical direction with respect to the cover member 22, aberration that is asymmetric with respect to the first axis 25 is generated in the cover member 22 in a second plane P8 (XZ plane) orthogonal to both of the object plane P1 and the image plane P2. Further, since the central axis of the first optical member 51 is inclined with respect to the first axis 25, aberration that is asymmetric with respect to the first axis 25 is generated in the first optical member 51 in the second plane P8. Here, the first optical member 51 is inclined with respect to the first axis 25 in the opposite direction to the direction in which the image plane P2 (cover member 22) is inclined with respect to the first axis 25, and thus the aberration generated in the first optical member 51 cancels at least a part or portion of the aberration generated in the cover member 22. In the embodiment, the aberration generated in the first optical member 51 cancels at least a part or portion of the aberration, which is included in the aberration generated in the cover member 22 and which is non-axisymmetric about the axis perpendicular to the image plane P2.

In the embodiment, the second optical member 52 (ninth lens 49) is arranged on the side of the image plane P2 with respect to the tenth optical surface A10 (aperture stop), namely, on a same side as the first optical member 51 with respect to the aperture stop of the image forming optical system 21. The second optical member 52 is arranged to be separate and away from the aperture stop so that another optical member (for example, the sixth to eighth lenses 46 to 48) is interposed or sandwiched between the second optical member 52 and the aperture stop of the image forming optical system 21. The second optical member 52 is arranged adjacent to the first optical member 51 in the travelling direction of the image forming light flux L2, namely in the direction from the object plane P1 to the image plane P2. The second optical member 52 is arranged closer to the side of the image plane P2 than the first optical member 51 in the direction from the object plane P1 to the image plane P2. In the embodiment, the second optical member 52 is arranged at a position closest to the image plane P2 among the optical members in the image forming optical system 21.

The second optical member 52 of the embodiment has a sixteenth optical surface A16 facing the side of the object plane P1 and a seventeenth optical surface A17 facing the side of the image plane P2. The second optical member 52 is a so-called meniscus lens in which the sixteenth optical surface A16 is convex toward the object plane P1 and the seventeenth optical surface A17 is concave toward the image plane P2. The second optical member 52 has a power with respect to the image forming light flux L2.

In the embodiment, the second optical member 52 is inclined with respect to the first axis 25 in the same direction same as the direction in which the image plane P2 is inclined with respect to the first axis 25. Namely, the second optical member 52 is inclined with respect to the first axis 25 in an opposite direction opposite to the direction in which the first optical member 51 is inclined with respect to the first axis 25. The second optical member 52 is provided with a third portion 55 arranged on the first side (for example, +Z side) with respect to the first axis 25 and a fourth portion 56 arranged on the second side (for example, −Z side) with respect to the first axis 25 in the area in which the image forming light flux L2 passes. As explained regarding the first optical member 51, the intersection line of the object plane P1 and the image plane P2 (second axis 26 shown in FIG. 3) is arranged on the second side (−Z side) with respect to the first axis 25; and the fourth portion 56 of the second optical member 52 is a portion closer to the second axis 26 than the third portion 55. The second optical member 52 is arranged to be closer to the image plane P2 in a direction from the fourth portion 56 to the third portion 55. The center axis of the second optical member 52 is inclined at approximately −3.51 degrees with respect to the first axis 25, as shown in Table 1 of FIG. 6.

Since the central axis of the second optical member 52 of the embodiment is inclined with respect to the first axis 25, aberration that is asymmetric with respect to the first axis 25 is generated in the second optical member 52 in the second plane P8. Here, the second optical member 52 is inclined with respect to the first axis 25 in the opposite direction to the direction in which the first optical member 51 is inclined with respect to the first axis 25, and thus the aberration generated in the second optical member 52 cancels at least a part or portion of the aberration generated in the first optical member 51. In the embodiment, the aberration generated in the second optical member 52 cancels at least a part or portion of the aberration, which is included in the aberration generated in the first optical member 51 and which is non-axisymmetric about the axis perpendicular to the image plane P2. Here, the non-axisymmetric aberration generated in the first optical member 51 is referred to as "first aberration", the aberration generated in the second optical member 52 is referred to as "second aberration" and the non-axisymmetric aberration generated in the cover member 22 is referred to as "third aberration". In the image forming optical system 21, the power of the second optical member 52, the inclination angle (amount of tilt relative to the center axis or the optical axis) of the second optical member 52, etc., are set such that remaining aberration, which is included in the first aberration and which has not been canceled by the second aberration, cancels at least a part or portion of the third aberration. In the embodiment, the power of the second optical member 52 is smaller than the power of the first optical member 51.

Figure 8:
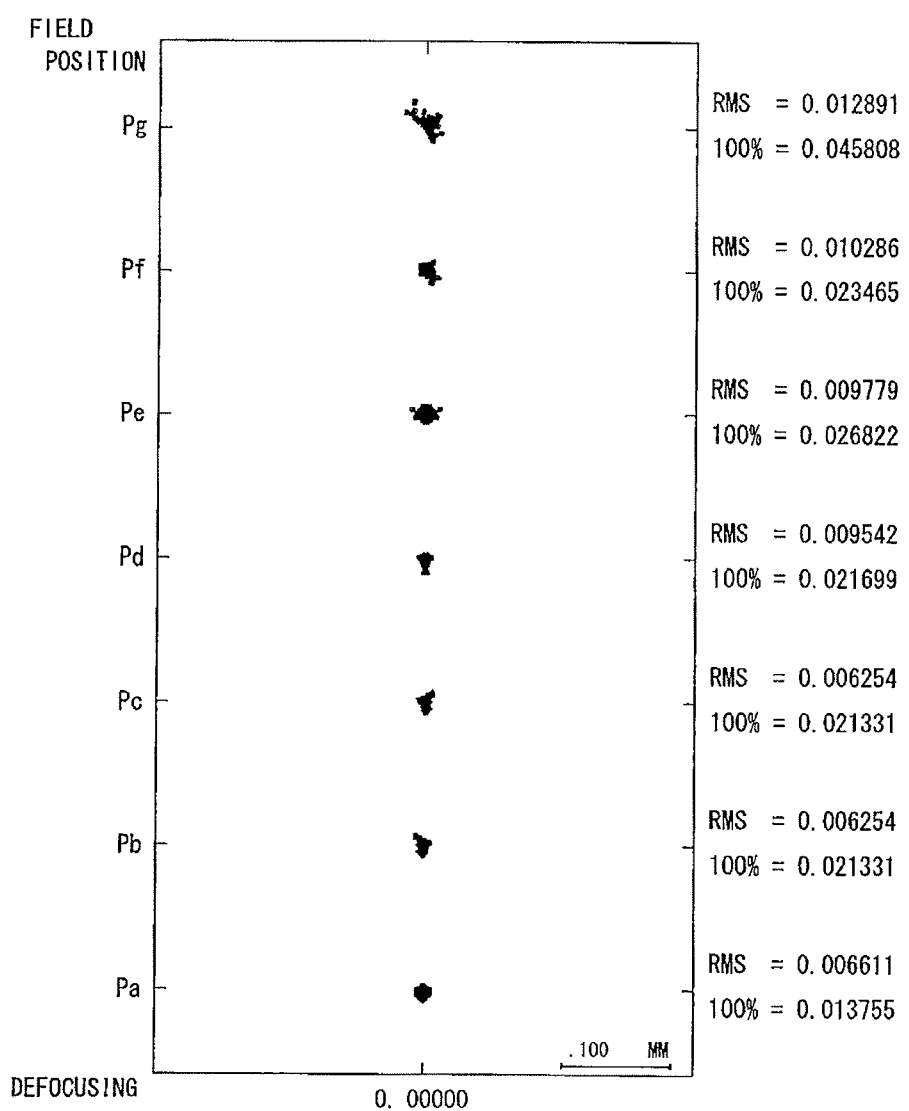
FIG. 8 is a spot diagram showing the aberration in the image plane in the first embodiment.

Next, an explanation will be given about the aberration of the image forming optical system. FIG. 8 is a spot diagram showing the aberration in the image plane of the embodiment. Namely, the aberration shown in FIG. 8 includes the aberration generated in the image forming optical system 21 and the aberration generated in the cover member 22.

Figure 7:
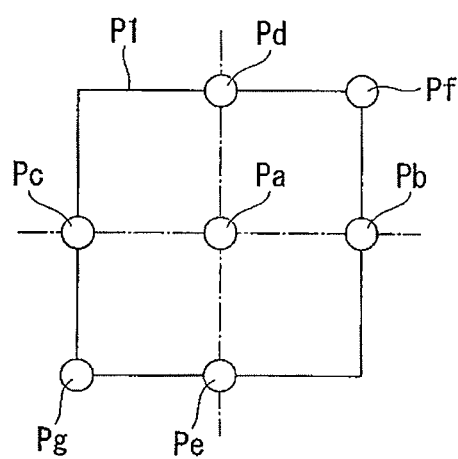
FIG. 7 is a view for explaining positions on the object plane corresponding to data shown in an aberration diagram.
Figure 9:
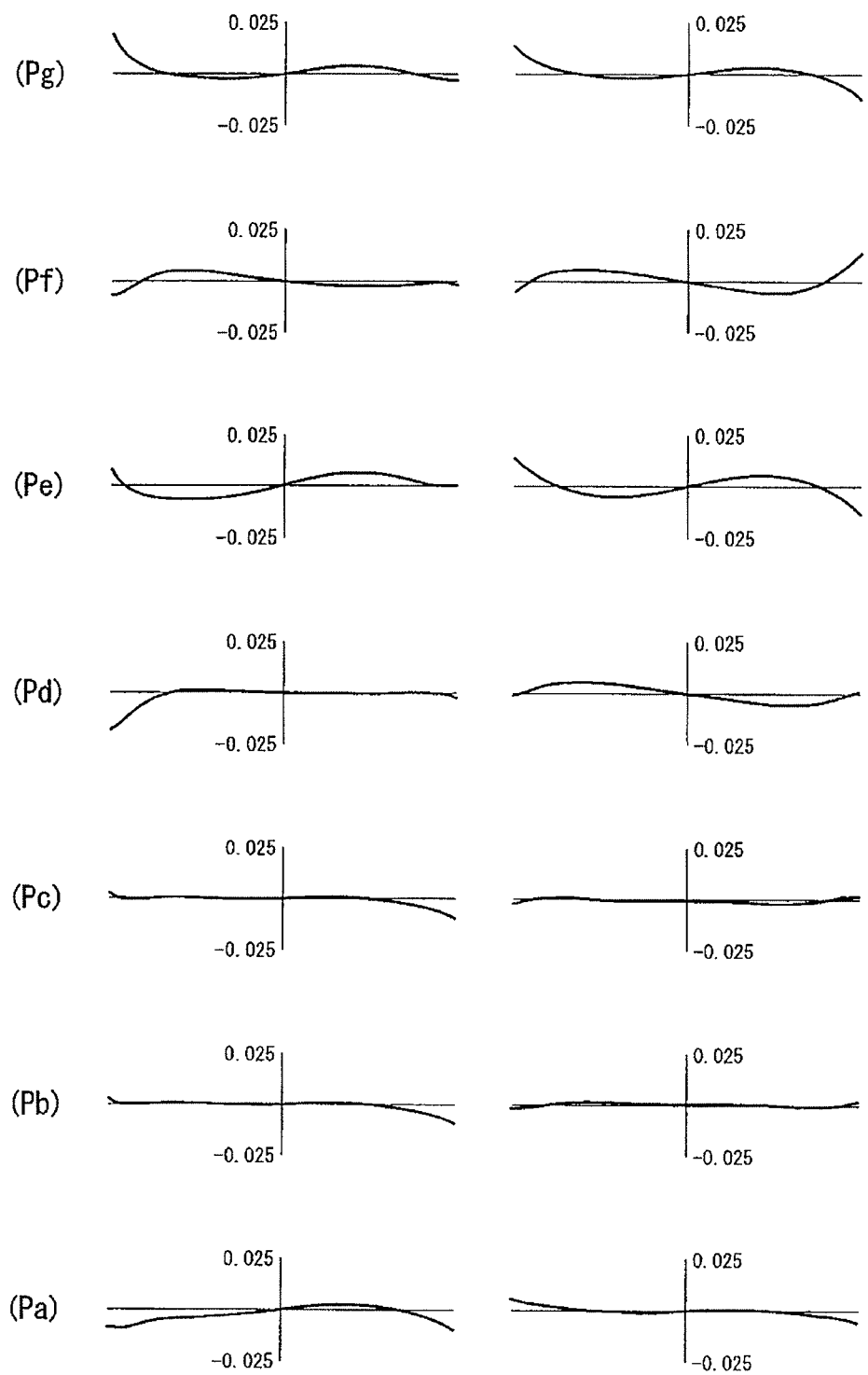
FIG. 9 is a view showing the coma aberration in the image forming optical system of the first embodiment.

Further, FIG. 7 is a view showing positions on the object plane corresponding to the data shown in the aberration diagram. FIG. 9 is a view showing the coma aberration in the image forming optical system 21 of the embodiment. Note that the view of aberration shown in FIG. 9 and views of aberrations in other embodiments to be described later on each show an amount of aberration (aberration amount) in a case that a light is traced from the image side to the object side. Although these aberration views show an aberration amount with respect to a light having a wavelength of 665 nm, same or similar results are obtained also regarding a light having a wavelength of 655 nm and a light having a wavelength of 645 nm.

Note that in the optical system, the aberration characteristic is normally same regardless of the propagation direction of the light. Further, since the coma aberration is not generated symmetrically with respect to the height of the object in the image forming optical system 21, the coma aberration is shown at each of positions of object points (points on the object). The reference numerals "Pa" to "Pg" shown in FIG. 9 correspond to positions "Pa" to "Pg" on the object plane P1 shown in FIG. 7.

Figure 10A:
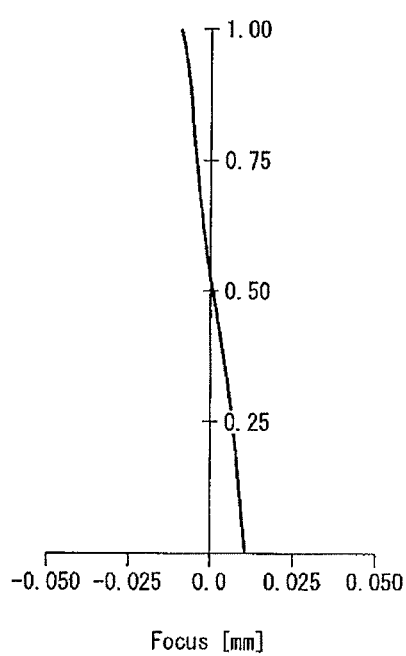
FIGS. 10A and 10B are views showing the spherical aberration and astigmatism in the image forming optical system of the first embodiment.
Figure 10B:
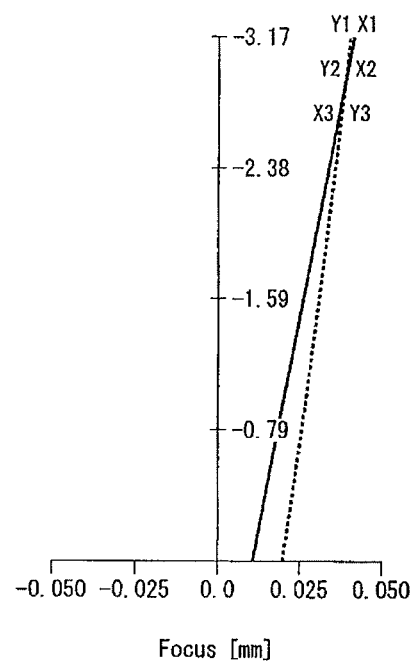

Further, FIGS. 10A and 10B are views showing the spherical aberration and astigmatism in the image forming optical system 21 of the embodiment, wherein the view showing the spherical aberration (FIG. 10A) indicates the aberration amount with respect to numerical aperture NA=0.48, and the view showing the astigmatism (FIG. 10B) indicates the aberration amount with respect to object height Y of the object. In the view showing the astigmatism (FIG. 10B), solid line shows the sagittal image surface with respect to the lights having the respective wavelengths, and broken line shows the meridional image surface with respect to the lights having the respective wavelengths. These explanations regarding the respective aberration views are same as regarding the other embodiments.

Figure 31:
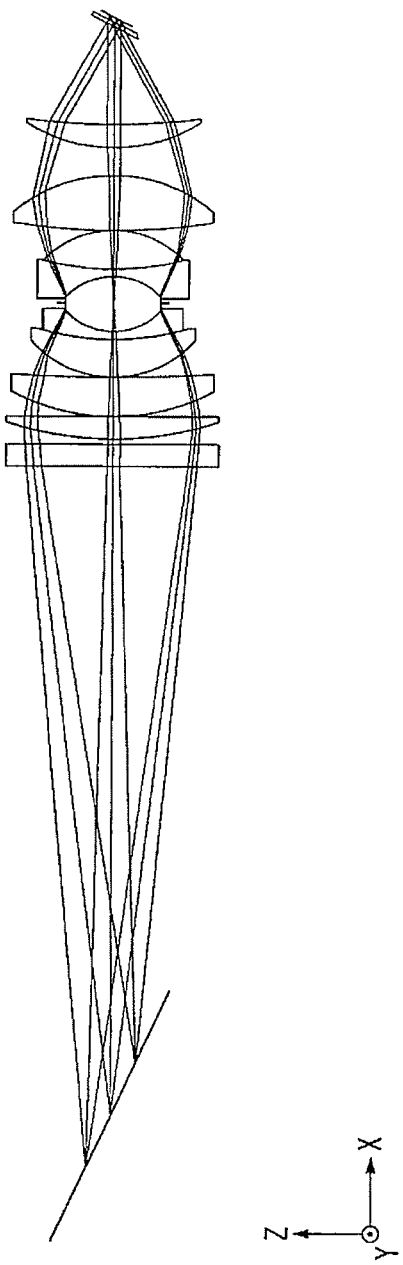
FIG. 31 is a view showing the configuration of an image forming optical system of a comparative example.
Figure 33:
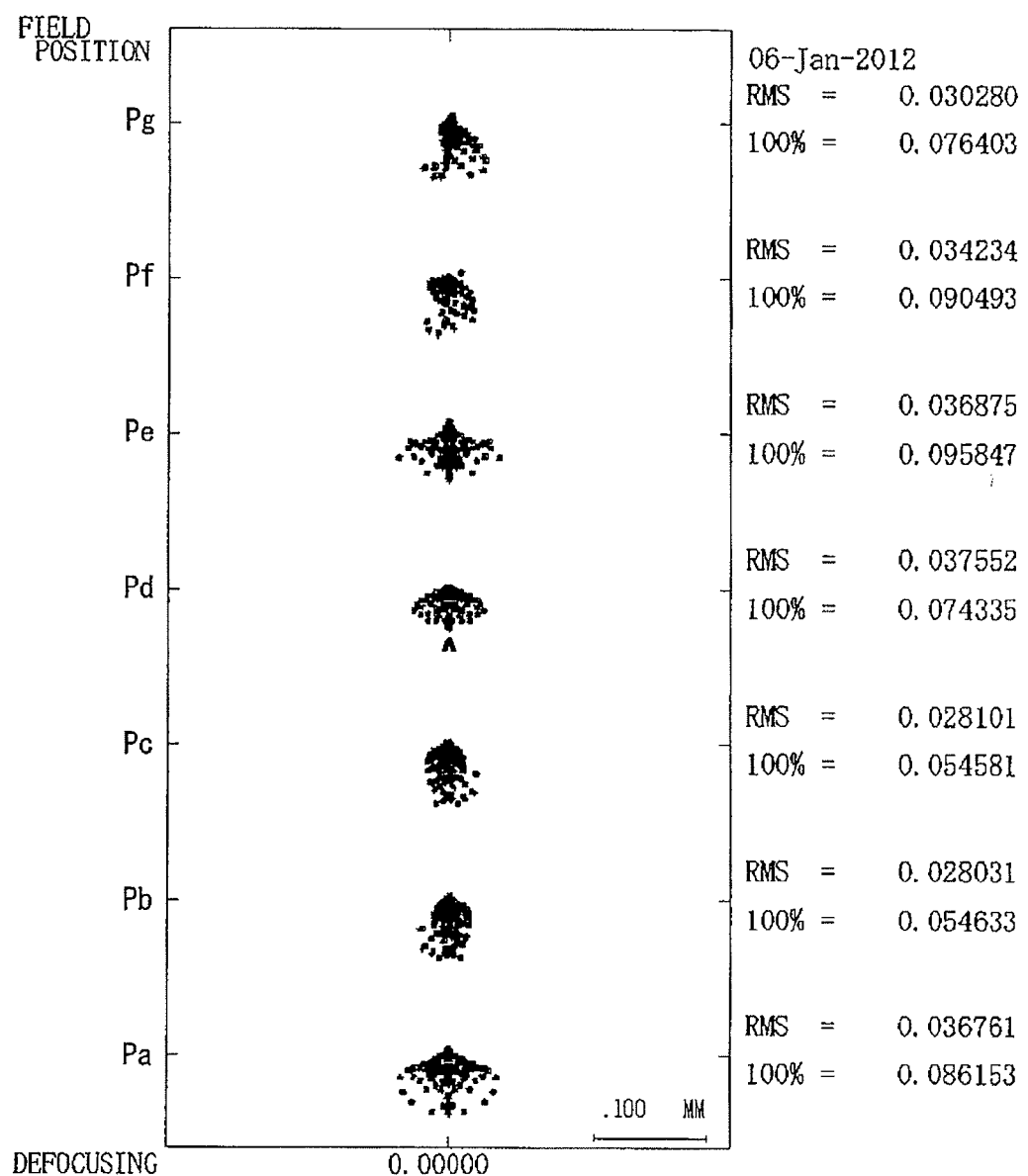
FIG. 33 is a spot diagram showing the aberration in the image plane in the comparative example.
Figure 34:
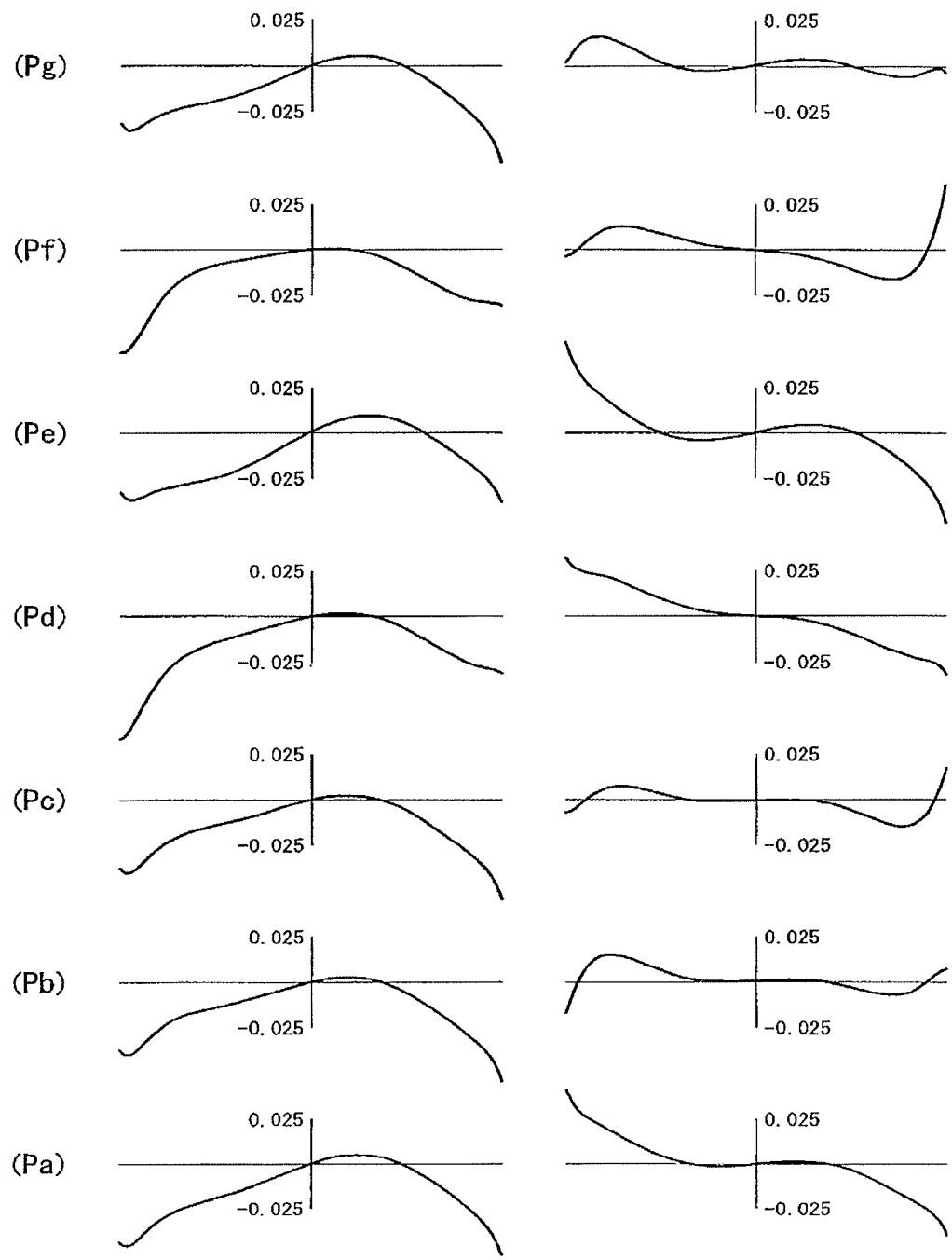
FIG. 34 a view showing the coma aberration in the image forming optical system of the comparative example.
Figure 35A:
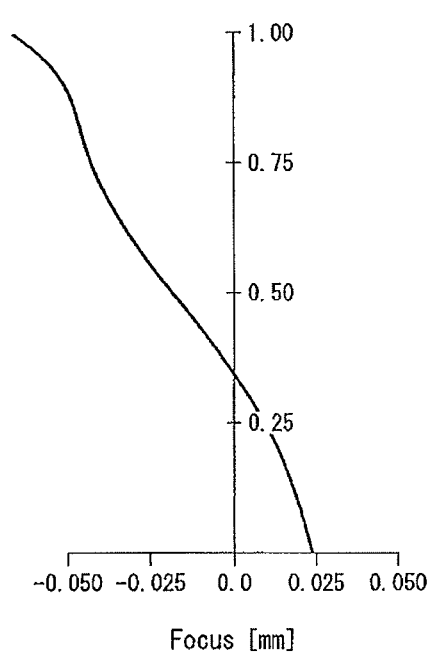
FIGS. 35A and 35B are views showing the spherical aberration and astigmatism in the image forming optical system of the comparative example.
Figure 35B:
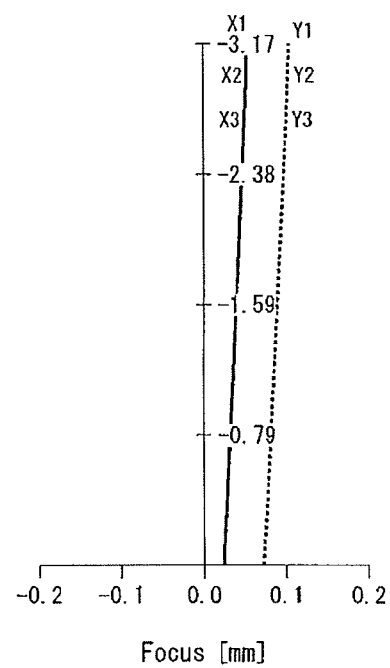

FIG. 31 is a view showing the configuration of an image forming optical system of a comparative example. FIG. 32 is Table 6 showing major items of the image forming optical system of the comparative example. The image forming optical system of the comparative example is provided with the cover member 22 in the imaging device 9, but is different from the image forming optical system of the embodiment in that any optical member of the image forming optical system is coaxial. Namely, the image forming optical system of the comparative example is substantially same as the image forming optical system of the embodiment in view of the radius of curvature of each of the lens elements, except that any of the lens elements is coaxial. FIG. 33 is a spot diagram showing the aberration in the image plane in the comparative example. FIG. 34 is a view showing the coma aberration in the image forming optical system of the comparative example. FIG. 35 is a view showing the spherical aberration and astigmatism in the image forming optical system of the comparative example.

As shown in FIGS. 8 to 10, by making an optical member(s) to be non-coaxial, the image forming optical system 21 of the embodiment achieves substantial improvement regarding the aberration than in the image forming optical system of the comparative example (see FIGS. 33 and 34).

In the above-described image forming optical system 21 of the embodiment, the first optical member 51 is inclined with respect to the first axis 25 in the opposite direction to the direction in which the image plane P2 is inclined with respect to the first axis 25. Accordingly, at least a part or portion of the non-axisymmetric aberration generated in the interface arranged between the image forming optical system 21 and the image plane P2 is canceled, and the non-axisymmetricity of the aberration generated in the image plane P2 (see FIG. 8) is reduced. For example, the aberration generated in the above-described interface (for example, the surface of the cover member 22) and the aberration generated in the image forming optical system 21 are corrected such that the light flux (partial light flux) exiting from one point on the object plane P1 have a spot shape, on the image plane P2, that is close to be axisymmetrical.

Further, the first optical member 51 of the embodiment has a power, and thus is capable of generating the aberration canceling the aberration generated in the above-described interface, while making it possible to allow the angle at which the first optical member 51 is inclined with respect to the first axis 25 to be small. Accordingly, the image forming optical system 21 is capable of realizing a small size in the direction parallel to the first axis 25. Further, the image forming optical system 21 is capable of correcting the aberration in the direction parallel to the second axis 26 because the first optical member 51 has the power.

Furthermore, the first optical member 51 of the embodiment is an optical member including an optical surface of which curvature is relatively small among the optical members of the image forming optical system 21. Therefore, the change in the off-axis aberration is not severe or acute with respect to the center axis of the first optical member 51. With this, the image forming optical system 21 has a high performance for correcting the non-axisymmetric aberration in the image plane P2. Moreover, in the first optical member 51, the curvature of the fourteenth optical surface A14 on the light-incident side of the image forming light flux L2 is smaller than the curvature of the fifteenth optical surface A15 on the light-exit side of the image forming light flux L2. With this, the image forming optical system 21 has a high performance for correcting the non-axisymmetric aberration. Further, since the first optical member 51 of the embodiment is an optical member having the optical surface different from the optical surface adjacent or next to the aperture stop of the image forming optical system 21, the image forming optical system 21 has a high performance for correcting the non-axisymmetric aberration.

Further, in the embodiment, since the first optical member 51 is inclined with respect to the first axis 25, the principal plane of the image forming optical system 21 is inclined with respect to the first axis 25 in the opposite direction to the direction in which the image plane P2 is inclined with respect to the first axis 25, as compared with the principal plane of an image forming optical system satisfying the Scheimpflug condition. Accordingly, in the embodiment, the image forming light flux L2 exiting from the image forming optical system 21 comes into the image plane P2 from a direction closer to the normal direction of the image plane P2, as compared with the image forming light flux exiting from the image forming optical system satisfying the Scheimpflug condition. As a result, the image forming light flux L2 comes into the interface (for example, the surface of the cover member 22), arranged between the image forming optical system 21 and the image plane P2, from the direction closer to the normal direction of the image plane P2, thereby suppressing the occurrence of non-axisymmetric aberration generated when the image forming light flux L2 is refracted by the interface.

Further, the image forming optical system 21 of the embodiment is provided with the second optical member 52 which is inclined with respect to the first axis 25 in the same direction as the direction in which the image plane P2 is inclined with respect to the first axis 25. Accordingly, in the image forming optical system 21, a part of the non-axisymmetric first aberration generated in the first optical member 51 is canceled by the non-axisymmetric second aberration generated in the second optical member 52. With this, the image forming optical system 21 has a high performance for correcting the non-axisymmetric aberration. Furthermore, the second optical member 52 is arranged on the same side (on the side of the image plane P2) with respect to the aperture stop (tenth optical surface A10) between the object plane P1 and the image plane P2. With this, the image forming optical system 21 has a high performance for correcting the non-axisymmetric aberration, as compared with a configuration in which the aperture stop of the image forming optical system 21 is arranged between the first and second optical members 51 and 52. Moreover, the second optical member 52 is arranged next to the first optical member 51 in the travelling direction of the image forming light flux L2. Accordingly, the image forming optical system 21 has a high performance for correcting the non-axisymmetric aberration, as compared with a configuration in which another optical member is arranged between the first and second optical members 51 and 52. Further, since the second optical member 52 of the embodiment is an optical member having the optical surface which is different from the optical surface adjacent or next to the aperture stop of the image forming optical system 21, the image forming optical system 21 has a high performance for correcting the non-axisymmetric aberration.

As described above, the image forming optical system 21 of the embodiment is capable of suppressing the substantial lowering of image formation performance. Further, since the substantial lowering of imaging performance of the image forming optical system 21 is suppressed, the imaging device 9 of the embodiment is capable of suppressing the lowering of imaging performance. Furthermore, in the imaging device 9, the imaging forming light flux L2 comes into the imaging element 20 in a direction near to the normal direction of the imaging element 20. Accordingly, the lowering of sensitivity of the imaging element 20 with respect to the image forming light flux L2 is suppressed, thereby making it possible to suppress the substantial lowering of the imaging performance.

Moreover, the profile measuring apparatus 1 of the embodiment suppresses the lowering of imaging performance of the imaging device 9, the accuracy for detecting the position at which the partial light flux described above exits in the object plane P1 is increased, thereby making it possible to suppress the lowering of measurement accuracy. Further, the profile measuring apparatus 1 uses the imaging device 9 to take an image of the object Q onto which the illumination light including laser light is irradiated, it is possible to easily secure the output level of the imaging device 9, thereby making it possible to suppress the lowering of measurement accuracy.

Incidentally, when an illumination light such as a laser light having high coherency is used in a profile measuring apparatus of conventional or ordinary type, there is such a possibility that speckle is generated in an image taken by the imaging device. In the profile measuring apparatus, when the NA on the image side of the image forming optical system 21 is increased, the pattern of the speckle becomes fine or minute to such an extent that the speckle pattern cannot be resolved by the pixels of the imaging device, which in turn makes it possible to lower the influence exerted by the speckle on the measurement result. However, in the profile measuring apparatus, as the NA on the image side of the image forming optical system 21 is higher, the occurrence of aberration becomes more prominent. Because of such a situation, there is a possibility that, for example, the non-axisymmetricity of the aberration on the image plane is increased, resulting in lowering the measurement accuracy. In the profile measuring apparatus, for example, when the NA on the image side of the image forming optical system is not less than 0.24, the occurrence of non-axisymmetric aberration becomes prominent in the surface of the imaging element, the cover glass, etc.

As described above, the profile measuring apparatus 1 of the embodiment is capable of suppressing the occurrence of non-axisymmetric aberration even in a case that the NA of the image forming optical system 21 is made to be, for example, not less than 0.24. Accordingly, it is possible to suppress the influence exerted by the speckle to the measurement result, while obtaining a bright image by using a laser light as the illumination light. Therefore, the profile measuring apparatus 1 of the embodiment is capable of remarkably suppressing the lowering of measurement accuracy.

Note that in the image forming optical system 21 of the embodiment, the first optical member 51 and the second optical member 52 among the plurality of optical members are inclined with respect to the first axis 25. However, it is allowable that only one optical member (only the first optical member 51) is arranged to be inclined with respect to the first axis 25, or that not less than three optical members are arranged to be inclined with respect to the first axis 25. Further, although the first optical member 51 of the embodiment has a power, it is allowable that the first optical member 51 does not have any power. For example, the first optical member 51 can be a member such as a parallel transmissive plate. The parallel transmissive plate is, for example, a member having a first plane into which the image forming light flux L2 comes and a second plane from which the image forming light flux L2 exits and which is parallel to the first plane. For example, the first optical member 51 can be a parallel transmissive plate of which refractive index and thickness are substantially same as those of the cover member 22. Alternatively, the first optical member 51 can be a member such as a prism extending in a direction parallel to the second axis 26. The prism can be, for example, a prism having a first plane into which the image forming light flux L2 comes and a second plane from which the image forming light flux L2 exits and which is not parallel to the first plane.

Second Embodiment

Next, an explanation will be given about a second embodiment. In the second embodiment, components or parts which are similar to those of the above-described embodiment are designated by the same reference numerals, and any detailed explanation therefor will be simplified or omitted.

Figure 11:
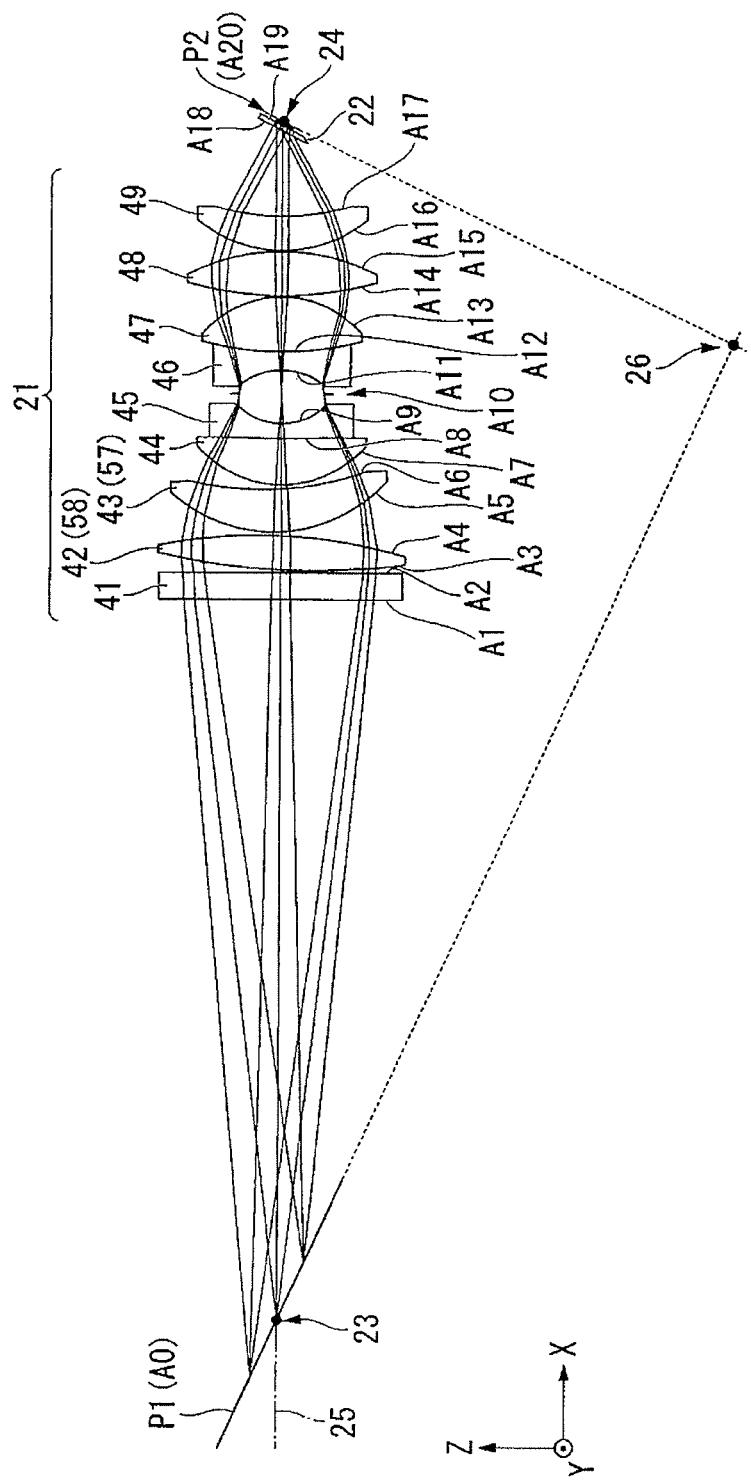
FIG. 11 is a view showing the configuration of an image forming optical system of a second embodiment.

FIG. 11 is a view showing the configuration of an image forming optical system 21 of the second embodiment. FIG. 12 is Table 2 showing major items of the image forming optical system 21 of the second embodiment. For example, the image forming optical system 21 of the second embodiment has the image-side numerical aperture (NA) that is 0.48, and the focal distance "f" that is 32.9 mm. The object plane 91 is, for example, a rectangular-shaped area of which size is 15 mm×15 mm.

As shown in FIG. 11, the image forming optical system 21 of the second embodiment is provided with a first cover glass 41 and second to ninth lenses 42 to 49. The shape of each of the first cover glass 41 and second to ninth lenses 42 to 49 of the second embodiment are approximately same as those of the first cover glass 41 and second to ninth lenses 42 to 49 in the first embodiment. In the second embodiment, each fourth to ninth lenses 44 to 49 has the optical axis which is substantially coaxial with the first axis 25. Therefore, the first axis is same as the optical axis of the image forming optical system 21.

In the second embodiment, the third lens 43 (hereinafter referred to as "first optical member 57") is inclined with respect to the first axis 25 in a direction opposite to the direction in which the image plane P2 is inclined with respect to the first axis 25. As shown in Table 2 of FIG. 12, the first optical member 57 is inclined at approximately 3.15 degrees with respect to the first axis 25. The first optical member 57 of the second embodiment is arranged on the side of the object plane P1 with respect to the aperture stop (tenth optical surface A10) of the image forming optical system 21, in the direction from the object plane P1 to the image plane P2.

In the second embodiment, the second lens 42 (hereinafter referred to as "second optical member 58") is inclined with respect to the first axis 25 in a direction same as the direction in which the image plane P2 is inclined with respect to the first axis 25. As shown in Table 2 of FIG. 12, the second optical member 58 is inclined at approximately −2.62 degrees with respect to the first axis 25. The second optical member 58 of the second embodiment is arranged on the same side (on the side of the object plane P1) as the first optical member 57, with respect to the aperture stop of the image forming optical system 21, in the direction from the object plane P1 to the image plane P2. The second optical member 58 is arranged at a position closer to the object plane P1 than the first optical member 57. The second optical member 58 is arranged next to the first optical member 57 in the direction from the object plane P1 to the image plane P2.

Figure 13:
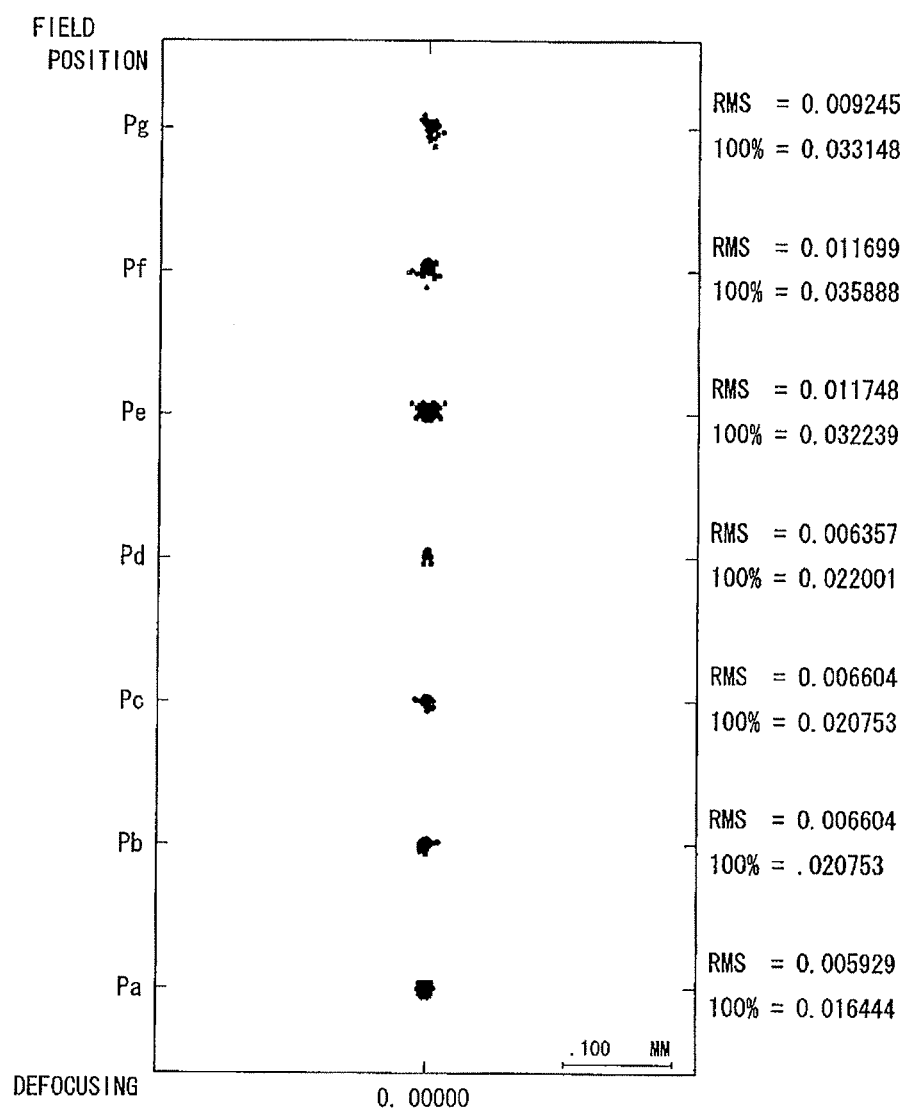
FIG. 13 is a spot diagram showing the aberration in the image plane in the second embodiment.
Figure 14:
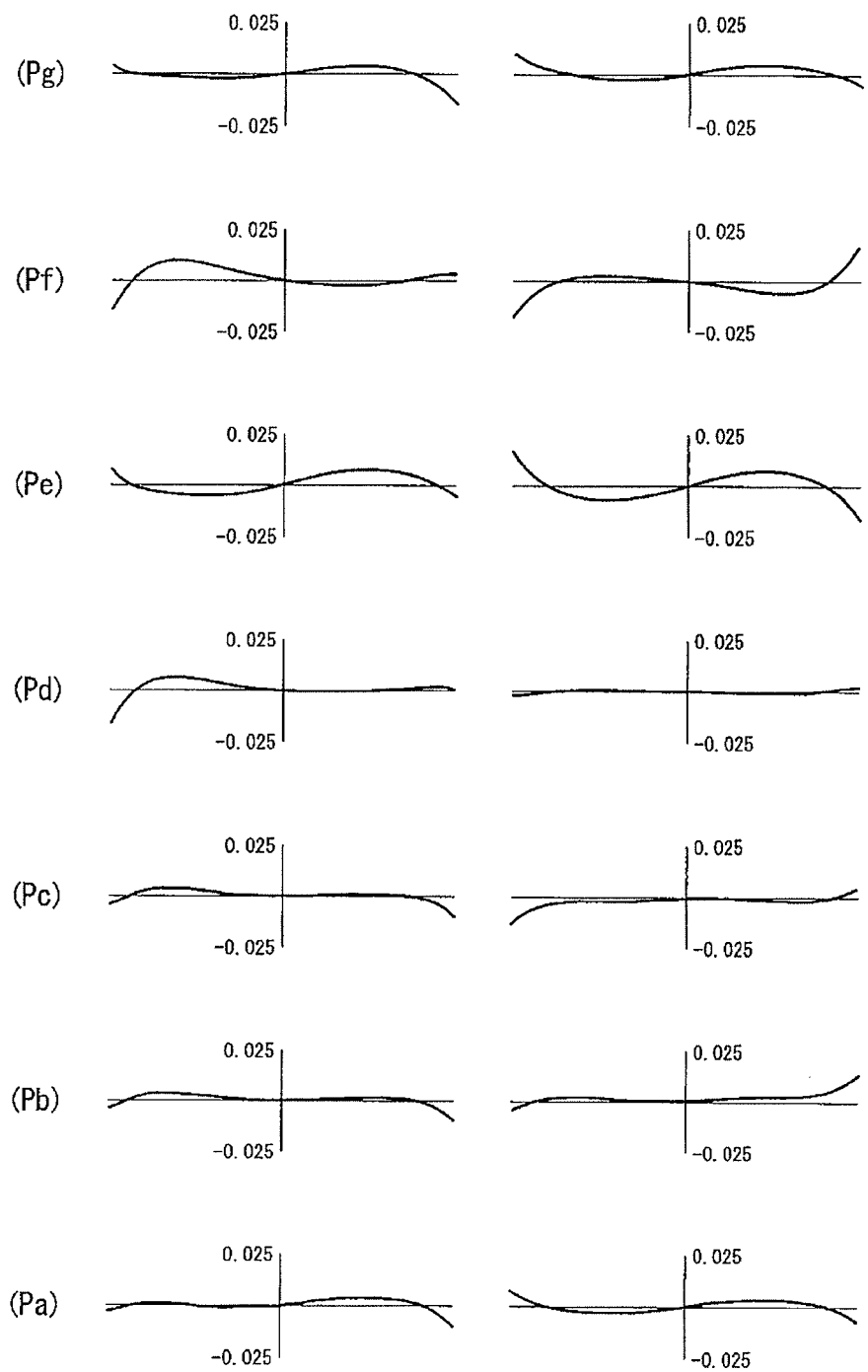
FIG. 14 a view showing the coma aberration in the image forming optical system of the second embodiment
Figure 15A:
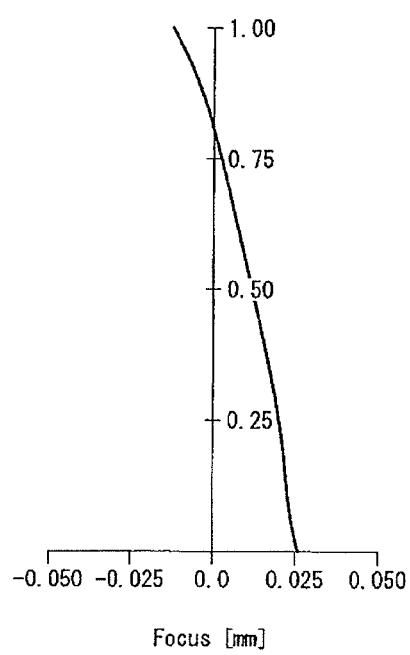
FIGS. 15A and 15B are views showing the spherical aberration and astigmatism in the image forming optical system of the second embodiment.
Figure 15B:
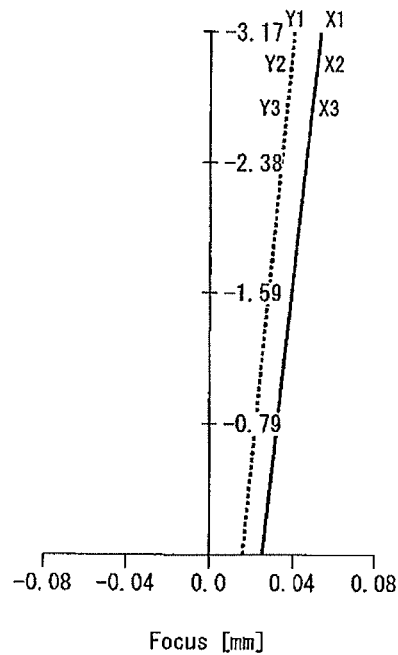

Next, an explanation will be given about the aberration of the image forming optical system of the second embodiment. FIG. 13 is a spot diagram showing the aberration in the image plane P2 of the second embodiment. FIG. 14 is a view showing the coma aberration in the image forming optical system of the second embodiment. FIG. 15 is a view showing the spherical aberration and astigmatism in the image forming optical system of the second embodiment. Regarding the manner to refer to the respective views of aberration, see the explanation on FIGS. 8 to 10 in the first embodiment as appropriate.

The image forming optical system 21 of the second embodiment allows the optical members to be non-coaxial to thereby correct the various aberrations satisfactorily, ensuring an excellent image forming performance, as shown in FIGS. 13 to 15.

In the image forming optical system 21 of the second embodiment as described above, the non-axisymmetricity of the aberration in the image plane P2 is reduced, as shown in FIG. 13. In such a manner, the image forming optical system 21 is capable of correcting the non-axisymmetric aberration, thereby making it possible to suppress the lowering of image forming performance, also in a case that the first optical member 57 is arranged on the side of the object plane P1 with respect to the aperture stop of the image forming optical system 21.

Third Embodiment

Next, an explanation will be given about a third embodiment. In the third embodiment, components or parts which are similar to those of the above-described embodiments are designated by the same reference numerals, and any detailed explanation therefor will be simplified or omitted.

Figure 16:
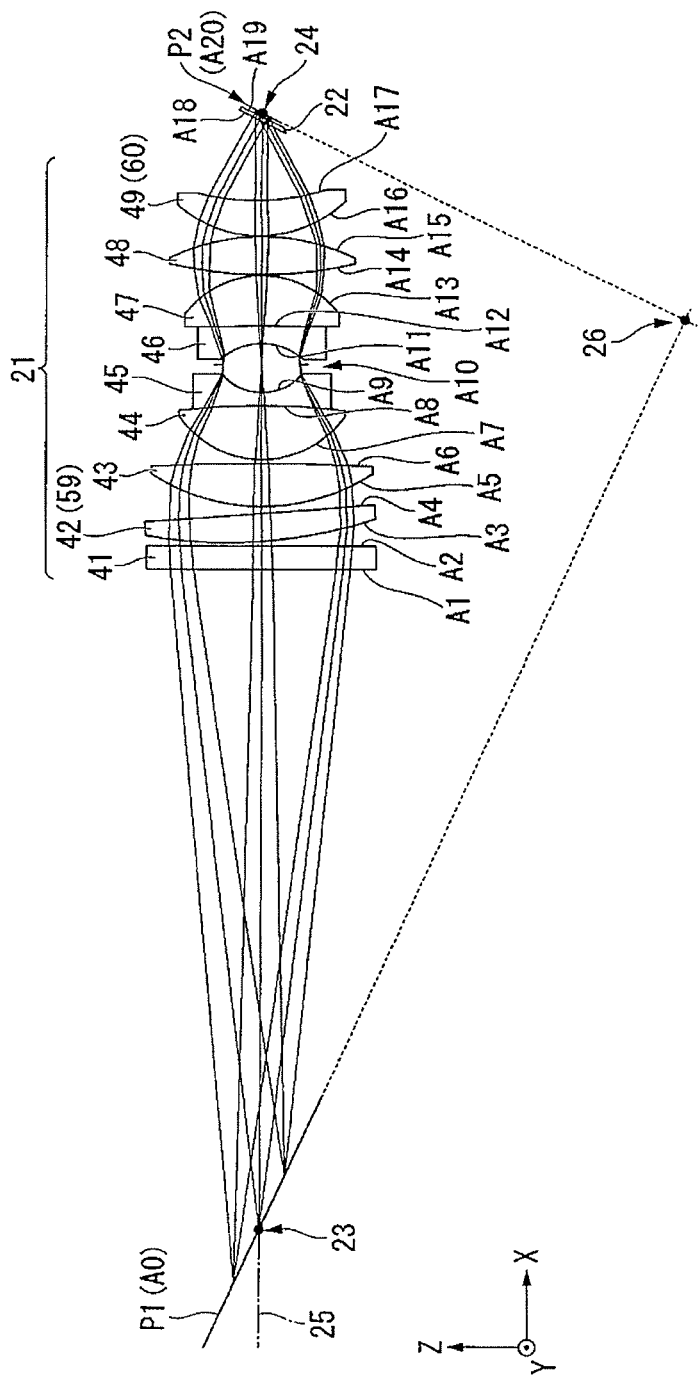
FIG. 16 is a view showing the configuration of an image forming optical system of a third embodiment.

FIG. 16 is a view showing the configuration of an image forming optical system 21 of the third embodiment. FIG. 17 is Table 3 showing major items of the image forming optical system 21 of the third embodiment. For example, the image forming optical system 21 of the third embodiment has the image-side numerical aperture (NA) that is 0.48, and the focal distance "f" that is 34.9 mm.

As shown in FIG. 16, the image forming optical system 21 of the third embodiment is provided with a first cover glass 41 and second to ninth lenses 42 to 49. The shape of each of the first cover glass 41 and second to ninth lenses 42 to 49 of the third embodiment are approximately same as those of the first cover glass 41 and second to ninth lenses 42 to 49 in the first embodiment. In the third embodiment, each of the first cover glass 41 and third to eighth lenses 43 to 48 has the central axis which is substantially coaxial with the first axis 25.

In the third embodiment, the second lens 42 (hereinafter referred to as "first optical member 59") is inclined with respect to the first axis 25 in a direction opposite to the direction in which the image plane P2 is inclined with respect to the first axis 25. As shown in Table 3 of FIG. 17, the first optical member 59 is inclined at approximately 4.13 degrees with respect to the first axis 25. The first optical member 59 of the third embodiment is arranged on the side of the object plane P1 with respect to the aperture stop (tenth optical surface A10) of the image forming optical system 21, in the direction from the object plane P1 to the image plane P2.

In the third embodiment, the ninth lens 49 (hereinafter referred to as "fourth optical member 60") is inclined with respect to the first axis 25 in the direction opposite to the direction in which the image plane P2 is inclined with respect to the first axis 25. As shown in Table 3 of FIG. 17, the fourth optical member 60 is inclined at approximately 1.25 degrees with respect to the first axis 25. The fourth optical member 60 of the third embodiment is arranged on the opposite side (on the side of the image plane P2) to the first optical member 59, with respect to the aperture stop of the image forming optical system 21, in the direction from the object plane P1 to the image plane P2. The fourth optical member 60 is arranged at a position closer to the image plane P2 than the first optical member 59. The fourth optical member 60 is arranged such that the third to eighth lenses 43 and 48 are interposed between the first optical member 59 and the fourth optical member 60, in the direction from the object plane P1 and the image plane P2.

Figure 18:
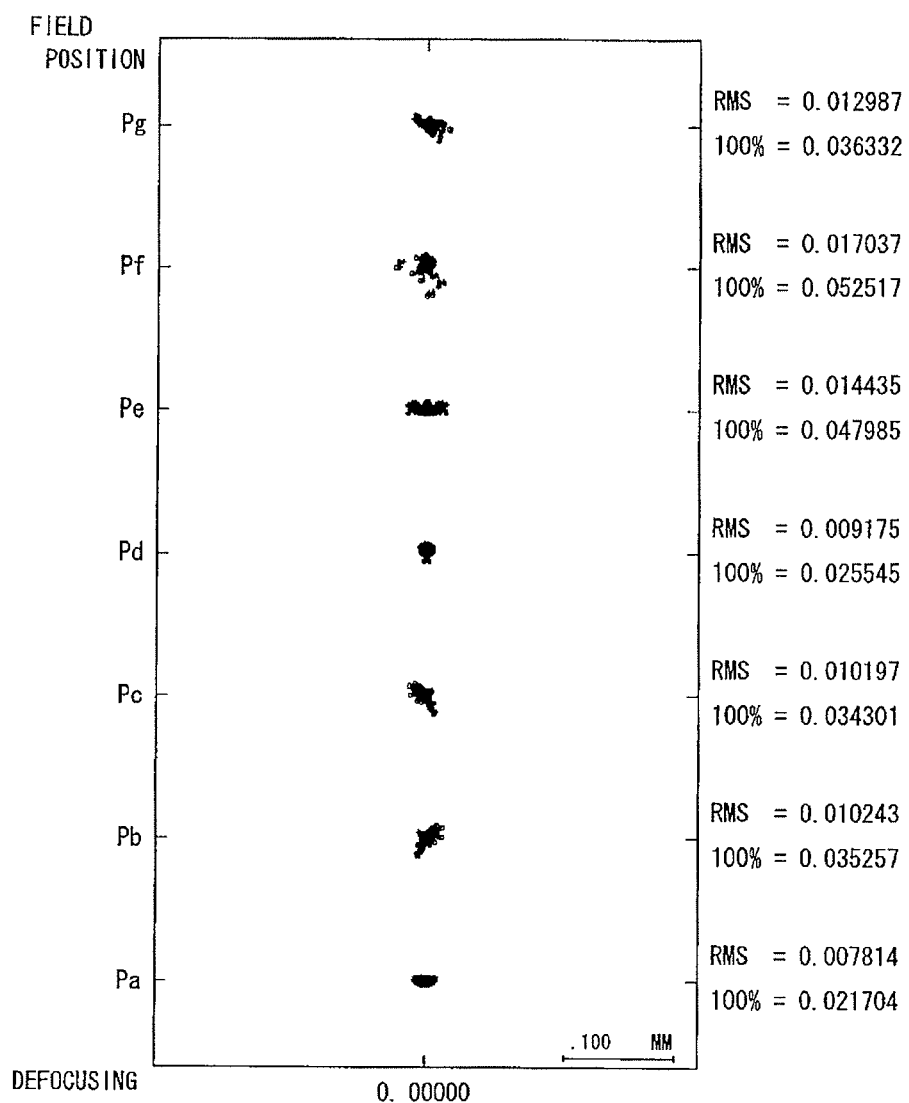
FIG. 18 is a spot diagram showing the aberration in the image plane in the third embodiment.
Figure 19:
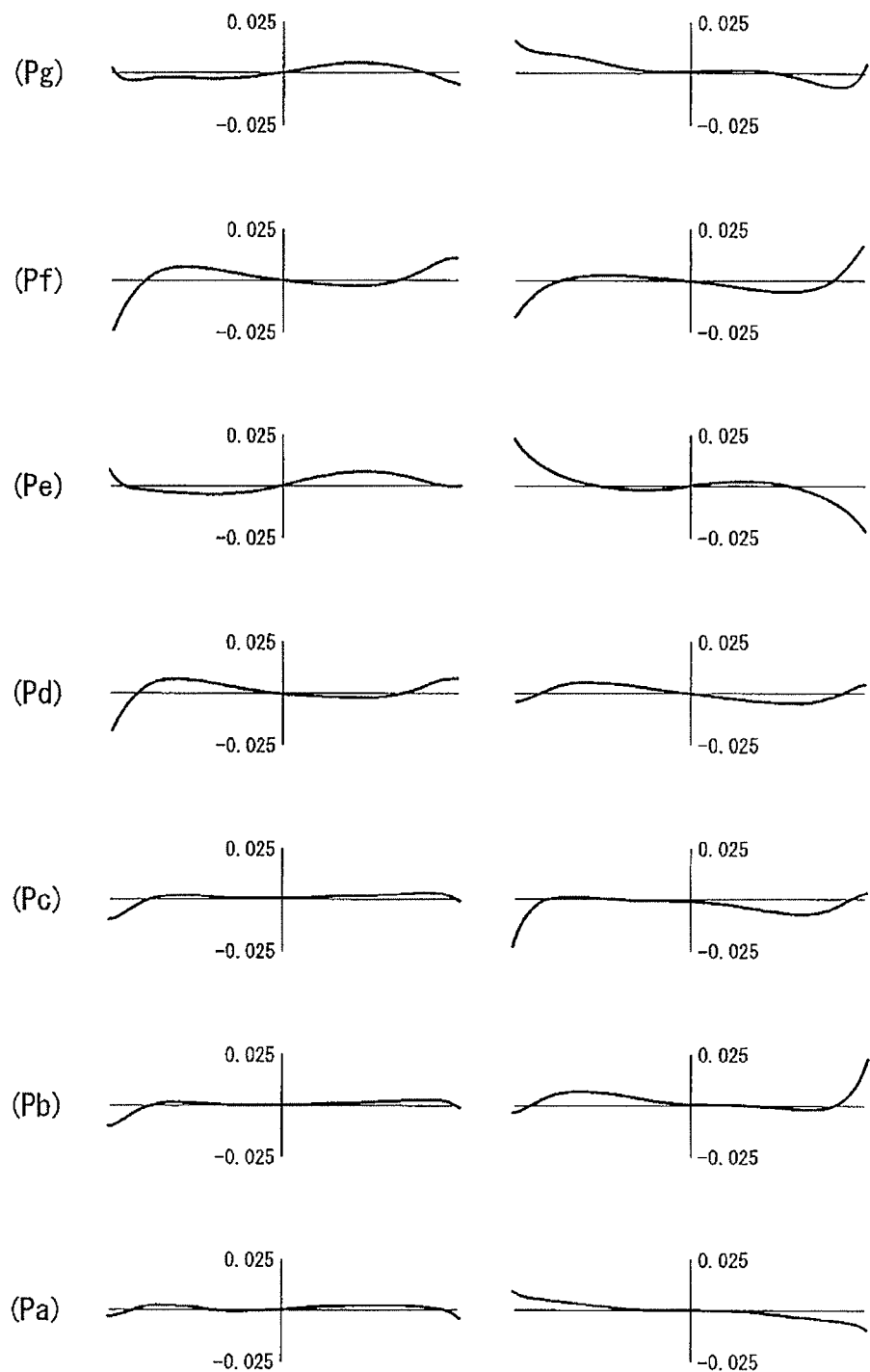
FIG. 19 a view showing the coma aberration in the image forming optical system of the third embodiment
Figure 20A:
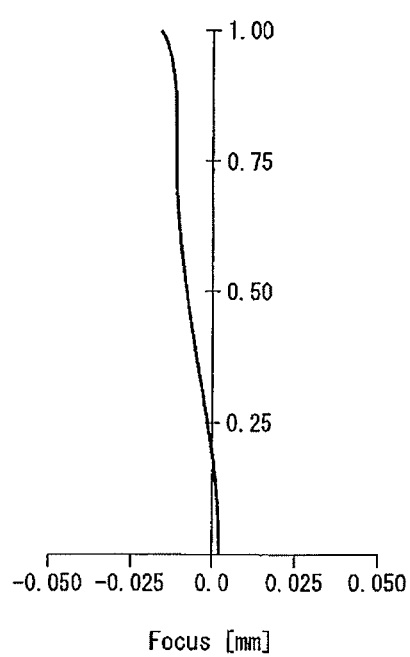
FIGS. 20A and 20B are views showing the spherical aberration and astigmatism in the image forming optical system of the third embodiment.
Figure 20B:
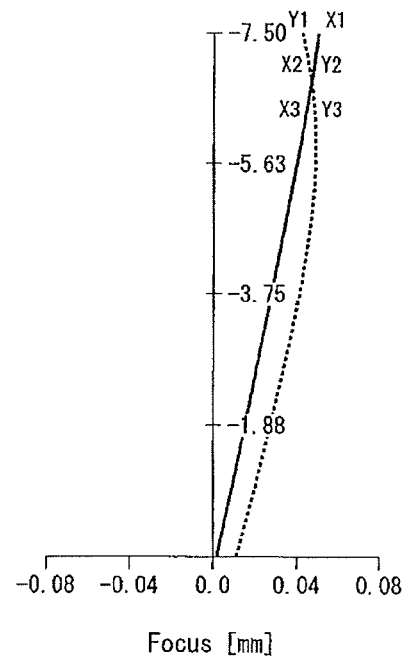

Next, an explanation will be given about the aberration of the image forming optical system of the third embodiment. FIG. 18 is a spot diagram showing the aberration in the image plane P2 of the third embodiment. FIG. 19 is a view showing the coma aberration in the image forming optical system of the third embodiment. FIG. 20 is a view showing the spherical aberration and astigmatism in the image forming optical system of the third embodiment. Regarding the manner to refer to the respective views of aberration, see the explanation on FIGS. 8 to 10 in the first embodiment as appropriate.

The image forming optical system 21 of the third embodiment allows the optical members to be non-coaxial to thereby correct the various aberrations satisfactorily, ensuring an excellent image forming performance, as shown in FIGS. 18 to 20.

As described above, the image forming optical system 21 of the third embodiment is provided with a plurality of optical members (first optical member 59 and the fourth optical member 60) which are inclined with respect to the first axis 25 in the opposite direction to the direction in which the image plane P2 is inclined with respect to the first axis 25. In the image forming optical system 21 as described above, the non-axisymmetricity of the aberration in the image plane P2 is reduced, as shown in FIG. 18. In such a manner, the image forming optical system 21 is capable of correcting the non-axisymmetric aberration, thereby making it possible to suppress the lowering of image forming performance, also in a case that the image forming optical system 21 is provided with the plurality of optical members which are inclined in the opposite direction to the direction in which the image plane P2 is inclined.

Note that it is allowable that the image forming optical system 21 is provided with a plurality of optical members which are inclined with respect to the first axis 25; that the plurality of optical members are arranged such that the optical members are adjacent or next to each other in the direction from the object plane P1 to the image plane P2, or that the plurality of optical members are arranged such that the optical members are separate and away from each other in the direction from the object plane P1 to the image plane P2, with another optical member being interposed therebetween. For example, the second optical member explained in the first embodiment, etc. described above, can be arranged such that another optical member is interposed between the second optical member and the first optical member. Alternatively, the second optical member can be arranged at the opposite side to the side at which the first optical member is arranged, with respect to the aperture stop of the image forming optical system 21.

Fourth Embodiment

Next, an explanation will be given about a fourth embodiment. In the fourth embodiment, components or parts which are similar to those of the above-described embodiment are designated by the same reference numerals, and any detailed explanation therefor will be simplified or omitted.

Figure 21:
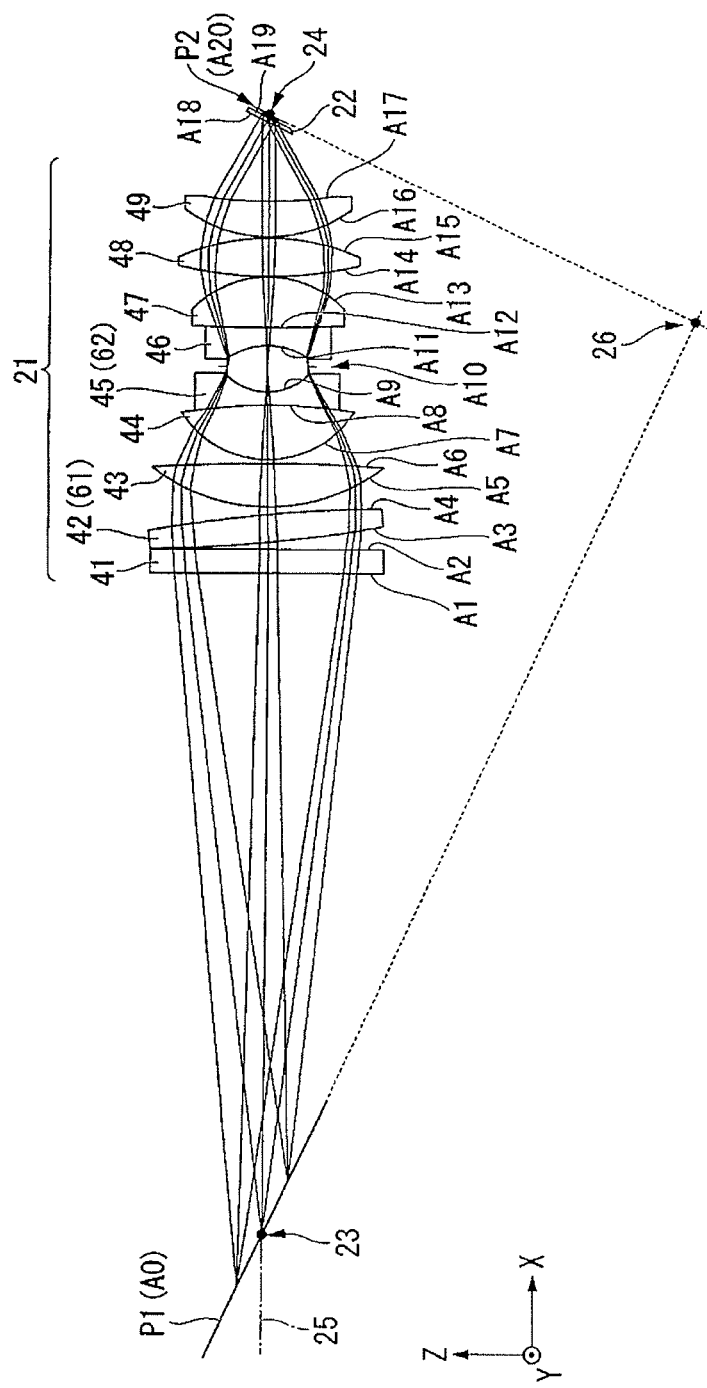
FIG. 21 is a view showing the configuration of an image forming optical system of a fourth embodiment.

FIG. 21 is a view showing the configuration of an image forming optical system 21 of the fourth embodiment. FIG. 22 is Table 4 showing major items of the image forming optical system 21 of the fourth embodiment.

As shown in FIG. 21, the image forming optical system 21 of the fourth embodiment is provided with a first cover glass 41 and second to ninth lenses 42 to 49. The shape of each of the first cover glass 41 and second to ninth lenses 42 to 49 of the fourth embodiment are approximately same as those of the first cover glass 41 and second to ninth lenses 42 to 49 in the first embodiment. In the fourth embodiment, each of the first cover glass 41, the third lens 43, the fourth lens 44 and the sixth to ninth lens 46 to 49 has the central axis which is substantially coaxial with the first axis 25.

In the fourth embodiment, the second lens 42 (hereinafter referred to as "first optical member 61") is inclined with respect to the first axis 25 in a direction opposite to the direction in which the image plane P2 is inclined with respect to the first axis 25. As shown in Table 4 of FIG. 22, the first optical member 61 is inclined at approximately 5.50 degrees with respect to the first axis 25. The first optical member 61 of the fourth embodiment is arranged on the side of the object plane P1 with respect to the aperture stop (tenth optical surface A10) of the image forming optical system 21, in the direction from the object plane P1 to the image plane P2.

In the fourth embodiment, the fifth lens 45 (hereinafter referred to as "fourth optical member 62") is inclined with respect to the first axis 25 in the direction opposite to the direction in which the image plane P2 is inclined with respect to the first axis 25 (inclined with respect to the first axis 25 in the same direction as the direction in which the first optical member 61 is inclined with respect to the first axis 25). As shown in Table 4 of FIG. 22, the fourth optical member 62 is inclined at approximately 0.35 degrees with respect to the first axis 25. The fourth optical member 62 of the fourth embodiment is arranged on the same side (on the side of the object plane P1) as the first optical member 61, with respect to the aperture stop of the image forming optical system 21, in the direction from the object plane P1 to the image plane P2. The fourth optical member 62 of the fourth embodiment is an optical member which is arranged next to the aperture stop of the image forming optical system 21. The fourth optical member 62 is arranged at a position closer to the image plane P2 than the first optical member 61. The fourth optical member 62 is arranged to be separate and away from the first optical member 61 such that the third lens 43 is interposed between the first optical member 61 and the fourth optical member 62, in the direction from the object plane P1 to the image plane P2.

Figure 23:
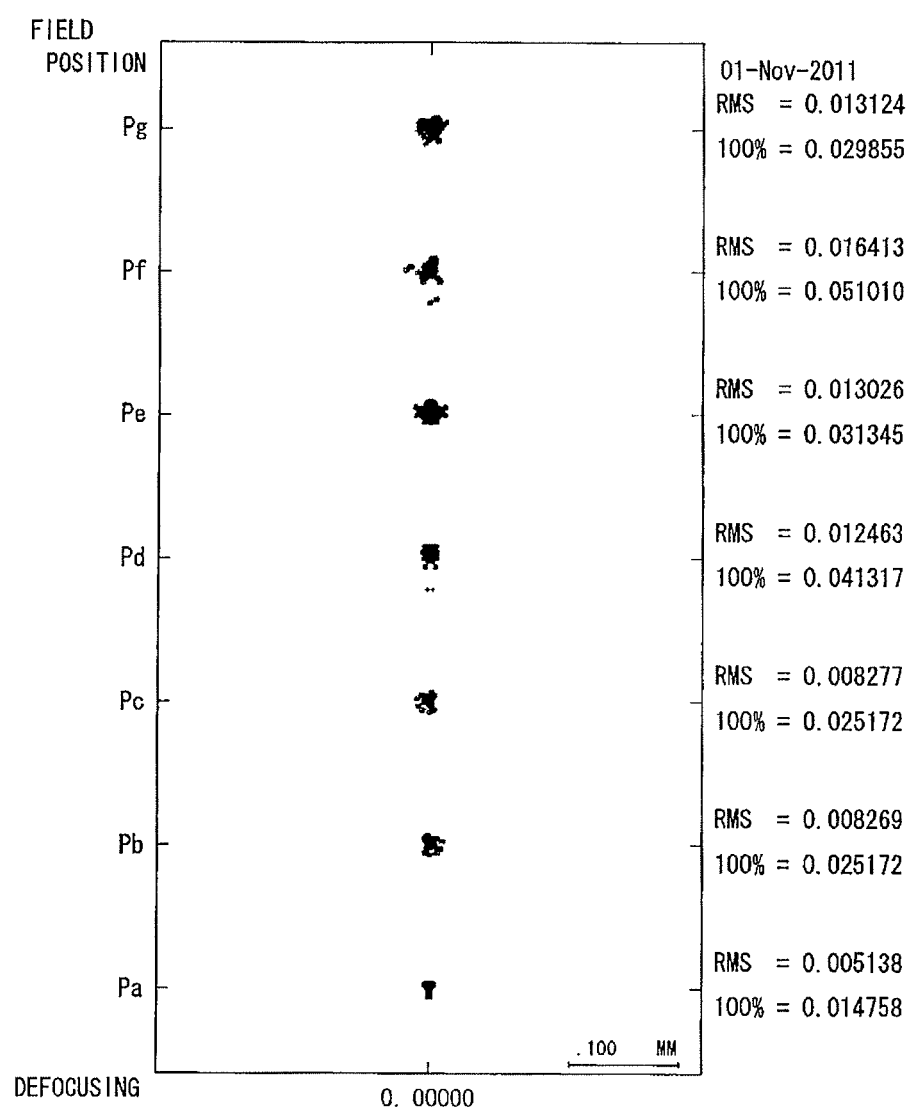
FIG. 23 is a spot diagram showing the aberration in the image plane in the fourth embodiment.
Figure 24:
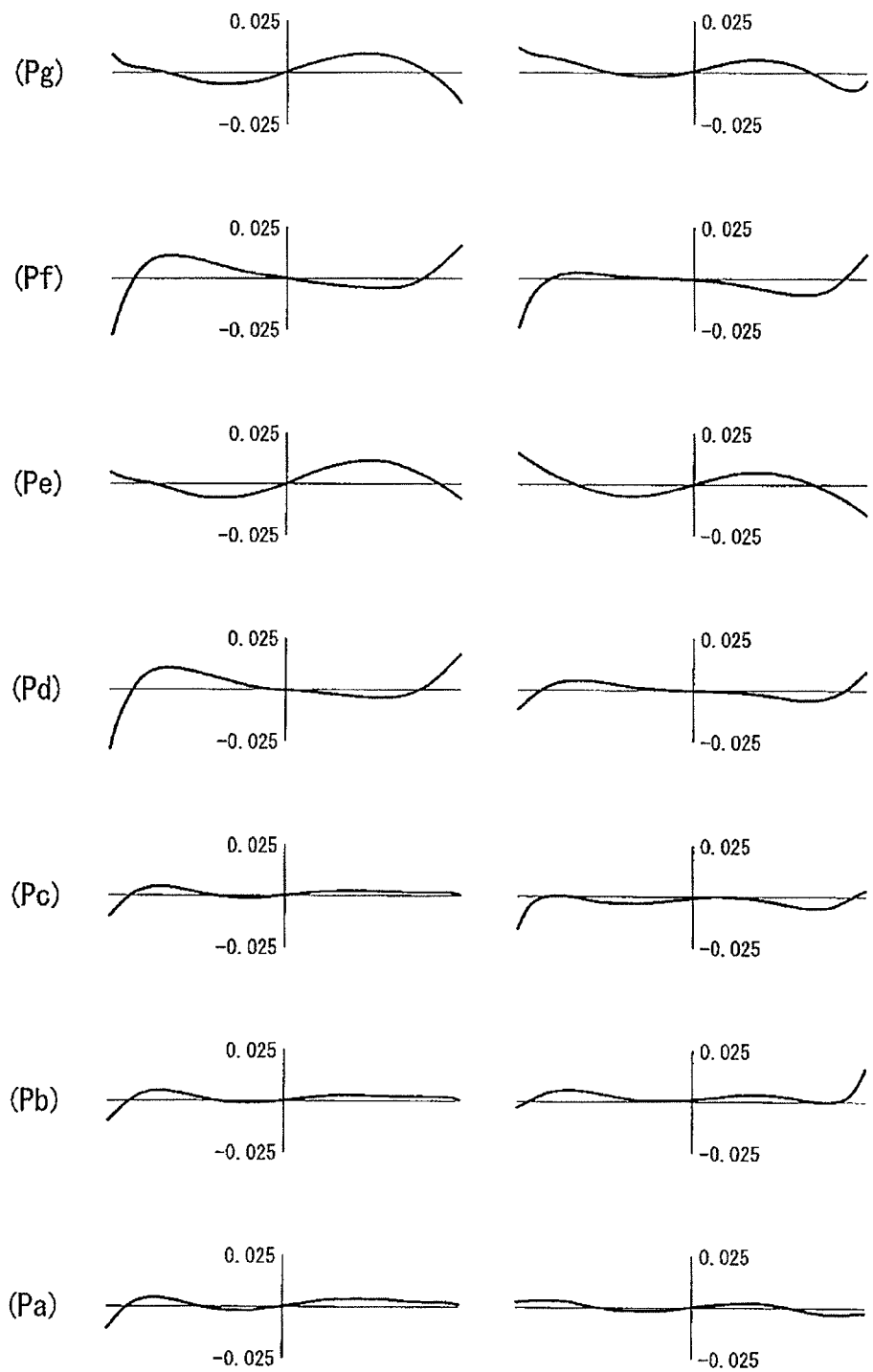
FIG. 24 a view showing the coma aberration in the image forming optical system of the fourth embodiment
Figure 25A:
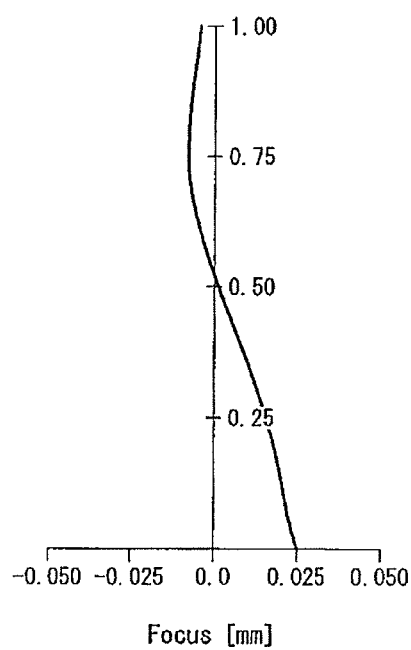
FIGS. 25A and 25B are views showing the spherical aberration and astigmatism in the image forming optical system of the fourth embodiment.
Figure 25B:
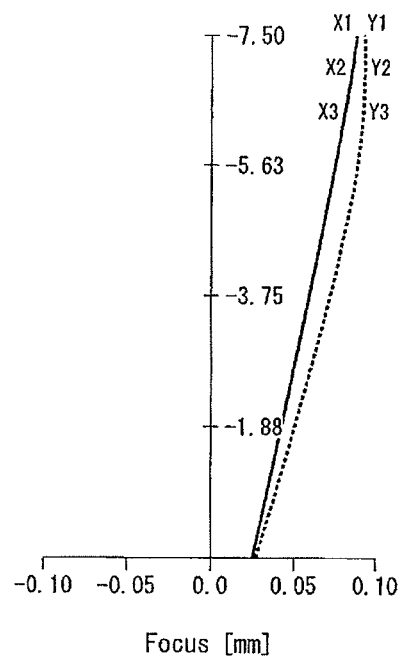

Next, an explanation will be given about the aberration of the image forming optical system of the fourth embodiment. FIG. 23 is a spot diagram showing the aberration in the image plane P2 of the fourth embodiment. FIG. 24 is a view showing the coma aberration in the image forming optical system of the fourth embodiment. FIG. 25 is a view showing the spherical aberration and astigmatism in the image forming optical system of the fourth embodiment. Regarding the manner to refer to the respective views of aberration, see the explanation on FIGS. 8 to 10 in the first embodiment as appropriate.

The image forming optical system 21 of the fourth embodiment allows the optical members to be non-coaxial to thereby correct the various aberrations satisfactorily, ensuring an excellent image forming performance, as shown in FIGS. 23 to 25.

As described above, the image forming optical system 21 of the fourth embodiment is provided with the fourth optical member 62 which is inclined with respect to the first axis 25 in the opposite direction to the direction in which the image plane P2 is inclined with respect to the first axis 25, and the fourth optical member 62 has an optical surface (ninth optical surface A9) which is arranged next to the aperture stop of the image forming optical system 21. In the image forming optical system 21 as described above, the non-axisymmetricity of the aberration in the image plane P2 is reduced, as shown in FIG. 23. In such a manner, the image forming optical system 21 is capable of correcting the non-axisymmetric aberration, thereby making it possible to suppress the lowering of image forming performance, also in a case that the image forming optical system 21 is provided with the fourth optical member 62 which is inclined in the opposite direction to the direction in which the image plane P2 is inclined and which is arranged next to the aperture stop of the image forming optical system 21.

Fifth Embodiment

Next, an explanation will be given about a fifth embodiment. In the fifth embodiment, components or parts which are similar to those of the above-described embodiment are designated by the same reference numerals, and any detailed explanation therefor will be simplified or omitted.

Figure 26:
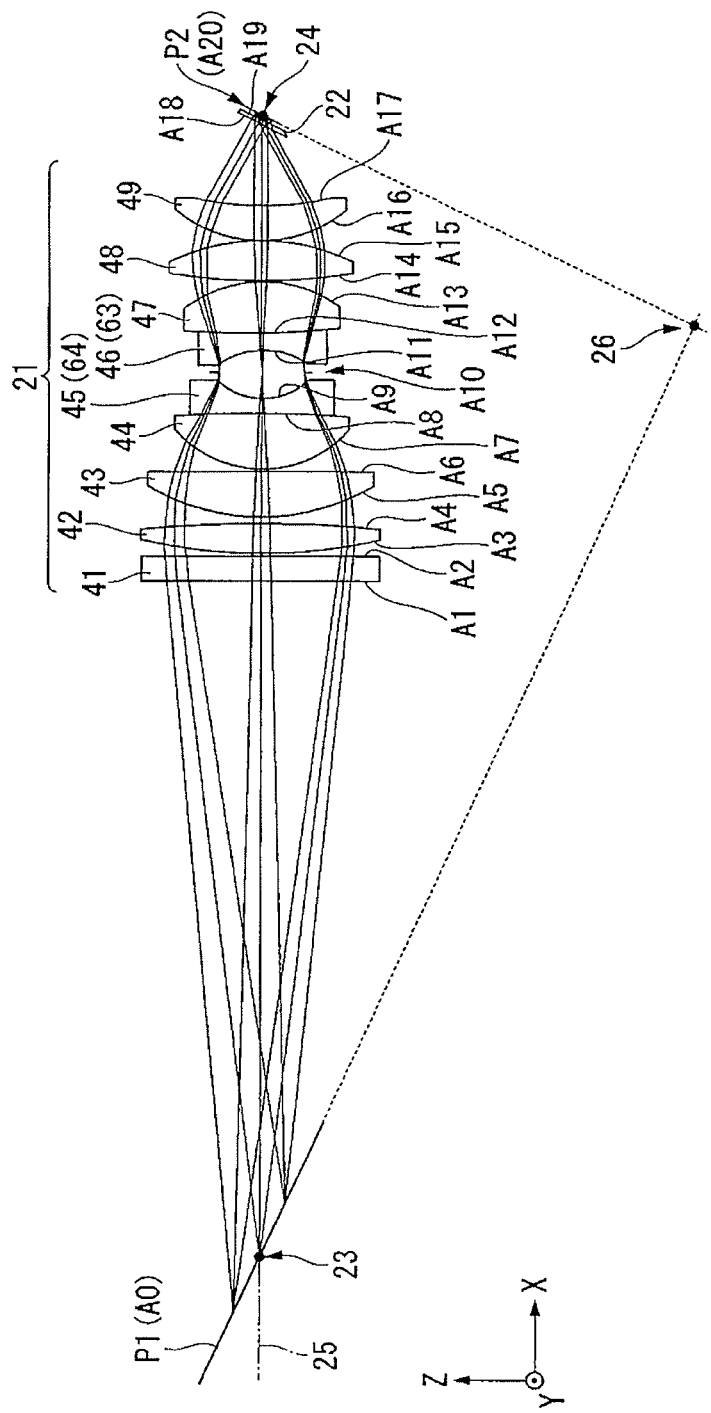
FIG. 26 is a view showing the configuration of an image forming optical system of a fifth embodiment.

FIG. 26 is a view showing the configuration of an image forming optical system 21 of the fifth embodiment. FIG. 27 is Table 5 showing major items of the image forming optical system 21 of the fifth embodiment. For example, the image forming optical system 21 of the fifth embodiment has the image-side numerical aperture (NA) that is 0.48, and the focal distance "f" that is 33.1 mm.

As shown in FIG. 26, the image forming optical system 21 of the fifth embodiment is provided with a first cover glass 41 and second to ninth lenses 42 to 49. The shape of each of the first cover glass 41 and second to ninth lenses 42 to 49 of the fifth embodiment are approximately same as those of the first cover glass 41 and second to ninth lenses 42 to 49 in the first embodiment. In the fifth embodiment, each of the first cover glass 41, the second to fourth lenses 42 to 44 and the seventh to ninth lenses 47 to 49 has the central axis which is substantially coaxial with the first axis 25.

In the fifth embodiment, the sixth lens 46 (hereinafter referred to as "first optical member 63") is inclined with respect to the first axis 25 in a direction opposite to the direction in which the image plane P2 is inclined with respect to the first axis 25. As shown in Table 5 of FIG. 27, the first optical member 63 is inclined at approximately 0.90 degrees with respect to the first axis 25. The first optical member 63 of the fifth embodiment is arranged on the side of the image plane P2 with respect to the aperture stop (tenth optical surface A10) of the image forming optical system 21, in the direction from the object plane P1 to the image plane P2. The first optical member 63 is an optical member arranged next to the aperture stop of the image forming optical system 21, in the direction from the object plane P1 to the image plane P2.

In the fifth embodiment, the fifth lens 45 (hereinafter referred to as "second optical member 64") is inclined with respect to the first axis 25 in the direction same as the direction in which the image plane P2 is inclined with respect to the first axis 25. As shown in Table 5 of FIG. 27, the second optical member 64 is inclined at approximately −0.48 degrees with respect to the first axis 25. The second optical member 64 of the fifth embodiment is arranged on the opposite side (on the side of the object plane P1) to the first optical member 63, with respect to the aperture stop of the image forming optical system 21, in the direction from the object plane P1 to the image plane P2. The second optical member 64 of the fifth embodiment is an optical member which is arranged next to the aperture stop of the image forming optical system 21. The second optical member 64 is arranged at a position closer to the object plane P1 than the first optical member 63. The second optical member 64 is arranged adjacent to the first optical member 63 in the direction from the object plane P1 and the image plane P2.

Figure 28:
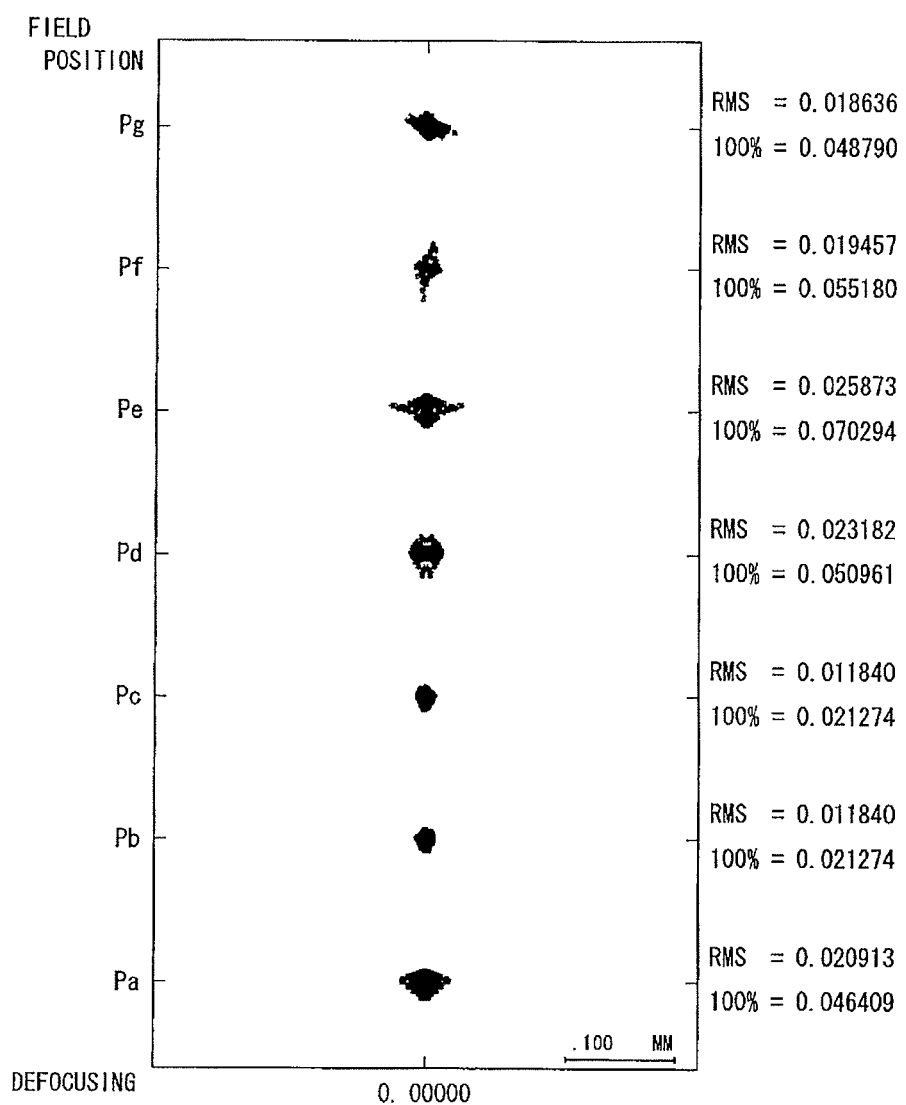
FIG. 28 is a spot diagram showing the aberration in the image plane in the fifth embodiment.
Figure 29:
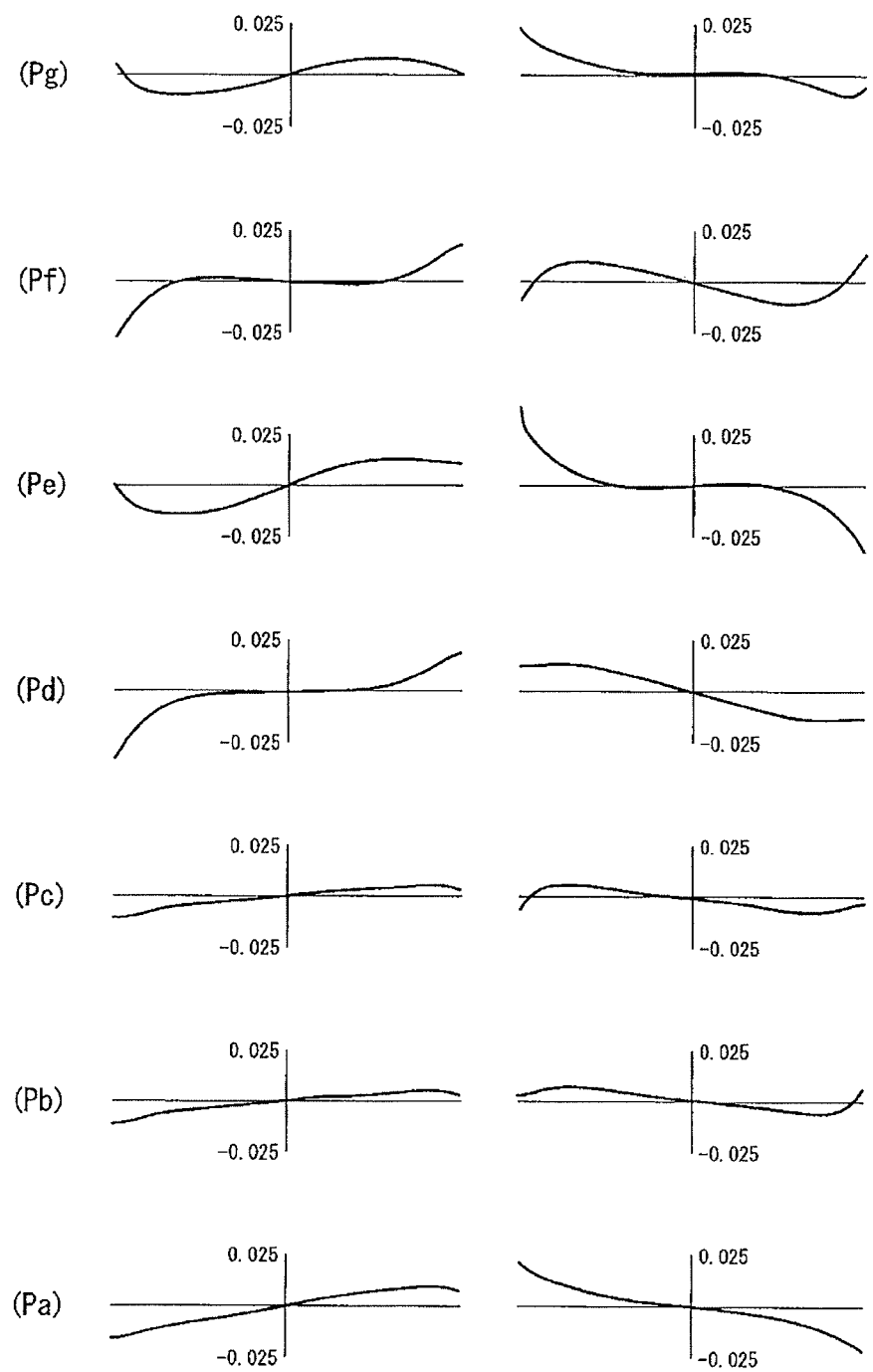
FIG. 29 a view showing the coma aberration in the image forming optical system of the fifth embodiment
Figure 30A:
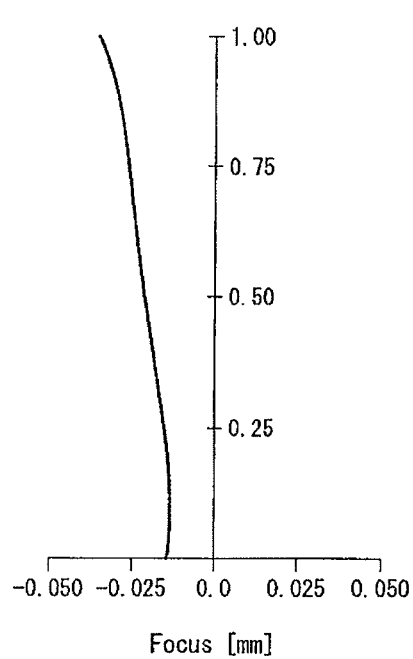
FIGS. 30A and 30B are views showing the spherical aberration and astigmatism in the image forming optical system of the fifth embodiment.
Figure 30B:
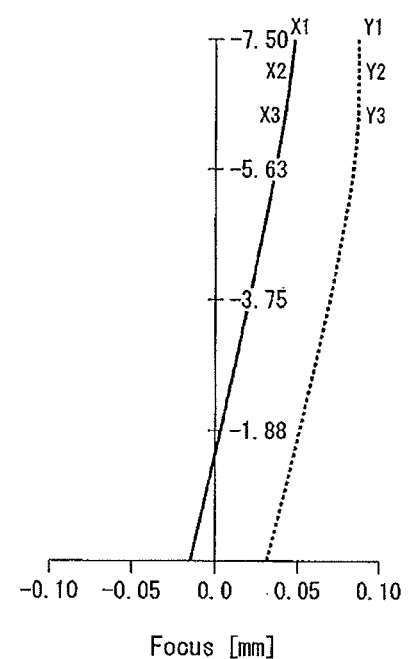

Next, an explanation will be given about the aberration of the image forming optical system of the fifth embodiment. FIG. 28 is a spot diagram showing the aberration in the image plane P2 of the fifth embodiment. FIG. 29 is a view showing the coma aberration in the image forming optical system of the fifth embodiment. FIG. 30 is a view showing the spherical aberration and astigmatism in the image forming optical system of the fifth embodiment. Regarding the manner to refer to the respective views of aberration, see the explanation on FIGS. 8 to 10 in the first embodiment as appropriate.

The image forming optical system 21 of the fifth embodiment allows the optical members to be non-coaxial to thereby correct the various aberrations satisfactorily, ensuring an excellent image forming performance, as shown in FIGS. 28 to 30.

As described above, the image forming optical system 21 of the fifth embodiment is provided with the first optical member 63 and the second optical member 64 each of which has an optical surface adjacent or next to the aperture stop of the image forming optical system 21. In the image forming optical system 21 as described above, the non-axisymmetricity of the aberration in the image plane P2 is reduced, as shown in FIG. 28. In such a manner, the image forming optical system 21 is capable of correcting the non-axisymmetric aberration, thereby making it possible to suppress the lowering of image forming performance, also in a case that the image forming optical system 21 is provided with the first optical member 63 and the second optical member 64 each of which is arranged next to the aperture stop of the image forming optical system 21.

Note that in the above-described embodiments, although the image forming optical system 21 is provided with 9 pieces of the optical member, it is allowable that the image forming optical system 21 is provided with not more than 8 pieces of the optical members, or not less than 10 pieces of the optical members. In the above-described embodiments, although each of the optical members provided on the image forming optical system 21 is a spherical lens, it is allowable that the image forming optical system 21 includes an aspherical lens. Further, the image forming optical system 21 can be provided with a reflecting member arranged in an optical path between the object plane P1 and the image plane P2. In such a case, the first axis 25 can be bent or fold on the reflecting surface of the reflecting member. In such a case, for example, by virtually folding back one of the optical path on the side of the object plane P1 and the optical path on the side of the image plane P2 with respect to the reflecting surface of the reflecting member in a plane symmetrical manner with respect to the reflecting surface, it is possible to obtain a straight-type image forming optical system equivalent to the image forming optical system 21. In a case that the first axis 25 is bent, the direction in which the optical member is inclined with respect to the first axis 25 can be defined in the above-described straight-type image forming optical system equivalent to the image forming optical system 21. Further, the image forming optical system 21 of the above-described embodiments can be used in an apparatus or device other than the imaging device 9, for example, in a projector, etc.

Note that although the imaging device 9 of the above-described embodiments is provided with the cover member 22, it is allowable that any member is not arranged between the imaging element 20 and an optical member which is included in the image forming optical system 21 and which is closest to the image plane P2 (for example, the ninth lens 49).

In such a case, the image forming optical system 21 is capable of correcting aberration, etc. generated when the image forming light flux L2 is refracted on the interface arranged in the optical path between the image plane P2 and the image forming optical system 21, for example, refracted on the surface of the imaging element 20, etc. Further, the imaging device 9 can be used for a focusing apparatus, other than the profile measuring apparatus 1, and can also be used for a purpose other than the measurement.

Note that although the profile measuring apparatus 1 of the above-described embodiments obtains profile information regarding a profile by employing the optical cutting method, it is allowable to obtain the profile information by employing the SFF (Shape From Focus) method, or by employing the confocal method. Further, although the profile measuring apparatus 1 of the above-described embodiments is provided with the light source device 8 including the solid light source configured to emit the laser light, the solid light source can include for example an LED, and can emit an illumination light not including any laser light. Furthermore, the light source device 8 can be a device which includes a lamp light source and which emits an illumination light not including any laser light. Moreover, it is allowable that the light source device 8 is an external device from the profile measuring apparatus 1, and that the profile measuring apparatus 1 is not provided with the light source device 8.

Figure 36:
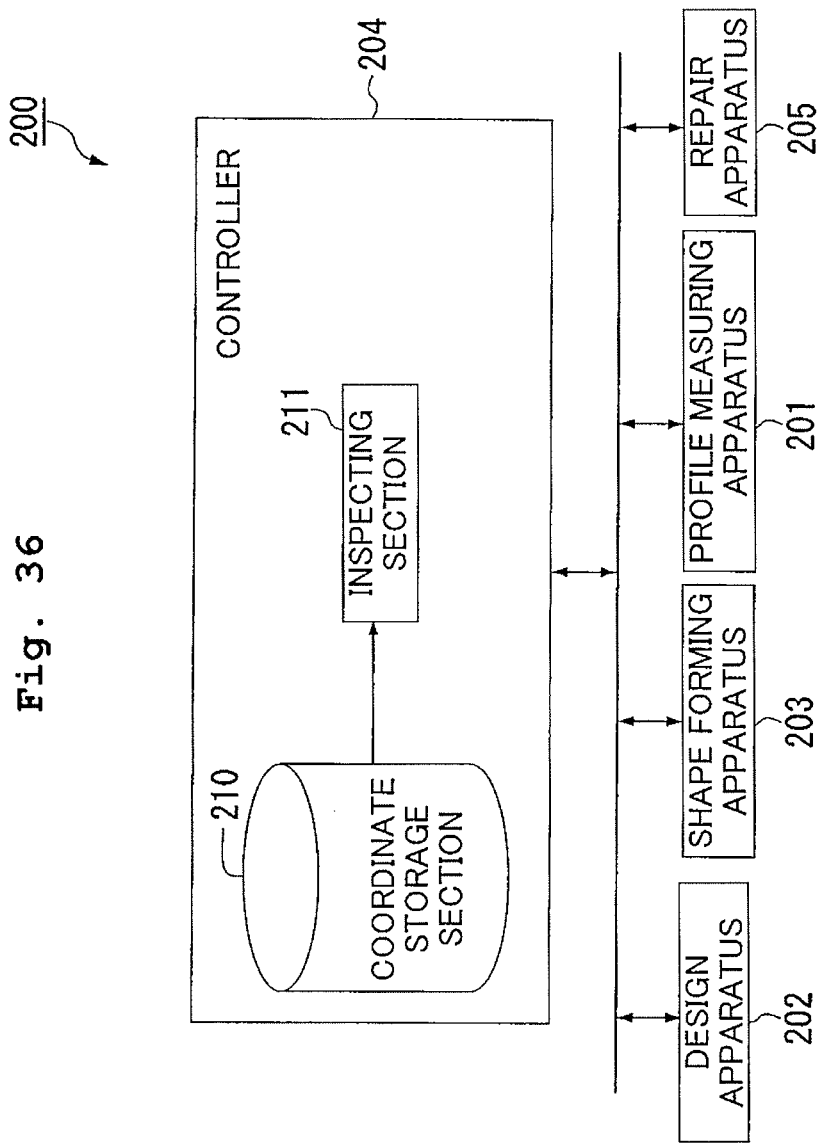
FIG. 36 is a view showing the configuration of a structure manufacturing system of an embodiment of the present teaching.

Next, an explanation will be given about a structure manufacturing system and a structure manufacturing method of the embodiment. FIG. 36 is a view showing the configuration of a structure manufacturing system 200 of the embodiment. The structure manufacturing system 200 of the embodiment is provided with a profile measuring apparatus 201 as explained in any of the above-described embodiments, a design apparatus 202, a shape forming apparatus 203, a controller (inspection apparatus) 204, and a repair apparatus 205. The controller 204 is provided with a coordinate storage section 210 and an inspecting section 211.

The design apparatus 202 creates design information with respect to the profile of a structure, and transmits the created design information to the shape forming apparatus 203. Further, the design apparatus 202 causes the created design information to be stored in the coordinate storage section 210 of the controller 204. The design information includes information indicating coordinates of each position of the structure.

The shape forming apparatus 203 creates the structure based on the design information inputted from the design apparatus 202. The shape-forming of the shape forming apparatus 203 includes, for example, casting, forging, and cutting. The profile measuring apparatus 201 measures the coordinates of the created structure (object-to-be-measured) and transmits information (profile information) indicating the measured coordinates to the controller 204.

The coordinate storage section 210 of the controller 204 stores the design information. The inspection section 211 of the controller 204 reads the design information from the coordinate storage section 210. The inspection section 211 compares the information (profile information) which indicates the coordinates and which is received from the profile measuring apparatus 201 and the design information which is read from the coordinate storage section 210. The inspection section 211 judges as to whether or not the structure is created in accordance with the design information based on the comparison result. In other words, the inspection section 211 judges as to whether or not the created structure is a nondefective structure. In a case that the structure is not created in accordance with the design information, the inspection section 211 judges as to whether or not the structure is repairable.

In a case that the structure is repairable, the inspection section 211 calculates a defective portion and a repair amount based on the comparison result to transmit, to the repair apparatus 205, information indicating the defective portion and information indicating the repair amount.

The repair apparatus 205 processes the defective portion of the structure based on the information indicating the defective portion and the information indicating the repair amount received from the controller 204.

Figure 37:
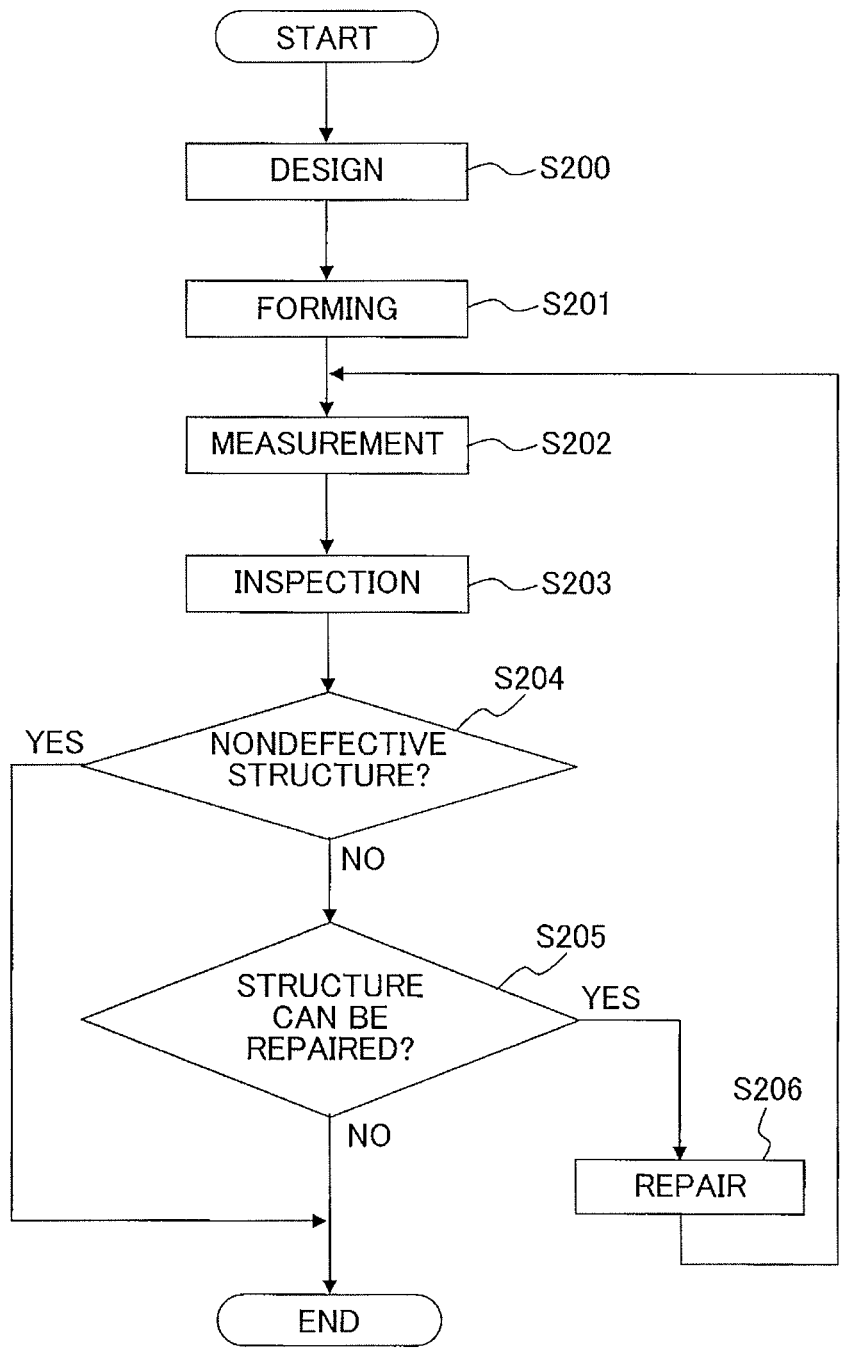
FIG. 37 is a flowchart showing a structure manufacturing method of an embodiment of the present teaching.

FIG. 37 is a flowchart showing a structure manufacturing method of the embodiment. In the embodiment, the respective processes in the structure manufacturing method shown in FIG. 37 are executed by the respective parts or components of the structure manufacturing system 200.

In the structure manufacturing system 200, at first, the design apparatus 202 creates the design information with respect to the profile of the structure (step S200). Next, the shape forming apparatus 203 creates the structure based on the design information (step S201). Next, the profile measuring apparatus 201 measures the profile of the created structure (step S202). Next, the inspection section 211 of the controller 204 inspects as to whether or not the structure is created in accordance with the design information by comparing the profile information obtained from the profile measuring apparatus 201 with the design information (step S203).

Next, the inspection section 211 of the controller 204 judges as to whether or not the created structure is nondefective (step S204). In a case that the inspection section 211 judges that the created structure is nondefective (step S204: Yes), the structure manufacturing system 200 completes the process. On the other hand, in a case that the inspection section 211 judges that the created structure is defective (step S204: No), the inspection section 211 judges as to whether or not the created structure is repairable (step S205).

In the structure manufacturing system 200, in a case that the inspection section 211 judges that the created structure is repairable (step S205: Yes), the repair apparatus 205 executes reprocessing of the structure (step S206) and then the process is returned to the step S202. On the other hand, in a case that the inspection section 211 judges that the created structure is not repairable (step S205: No), the structure manufacturing system 200 completes the process.

In the structure manufacturing system 200 of the embodiment, since the profile measuring apparatus 201 in any of the above-described embodiments is capable of accurately measuring the coordinates (three-dimensional profile) of the structure, the structure manufacturing system 200 is capable of judging as to whether or not the created structure is nondefective. Further, in a case that the structure is defective, the structure manufacturing system 200 is capable of executing the reprocessing of the structure to repair the structure.

Note that the repair process executed by the repair apparatus 205 in the embodiment can be replaced by a process in which the shape forming apparatus 203 re-executes the shape forming process. When doing so, in a case that the inspecting section 211 of the controller 204 judges that the repair can be made, the shape forming apparatus 203 re-executes the shape-forming process (casting, forging, cutting, etc.). Specifically, for example, the shape forming apparatus 203 cuts a portion in the structure which should be originally cut but not has been cut. By doing so, the structure manufacturing system 200 is capable of manufacturing the structure accurately.

Note that the technical scope of the present teaching is not limited to the above-described embodiments. For example, one or more of the elements explained in the embodiments is omitted in some cases. Further, the elements explained in the embodiments can be combined as appropriate.

What is claimed is:

1. A measuring apparatus comprising:
    an imaging optical system configured to form an image of an object to be measured; and
    an imaging section including a transmissive member which is arranged in the vicinity of an image plane of the imaging optical system to be inclined with respect to an optical axis of the imaging optical system;
    wherein the imaging optical system includes a first optical member which is non-coaxial with respect to the optical axis, and which has a surface that is rotationally symmetric about a first symmetry axis,
    wherein the transmissive member is arranged along the image plane, and is a flat member via which a light flux condensed by the imaging optical system is transmissive,
    wherein the first symmetry axis with respect to the optical axis is inclined in a plane that includes the optical axis and a first axis connecting a first point in the object plane and a second point in the image plane conjugate with the first point in the object plane, and that is perpendicular to an intersection line between a plane including the object plane and a plane including the imaging plane, and
    wherein the first optical member is inclined in an opposite direction to a direction in which the transmissive member is inclined with respect to the optical axis.

2. The measuring apparatus according to claim 1, wherein the first optical member is arranged to be non-coaxial with respect to the optical axis so that the first optical member lowers aberration generated in the transmissive member.

3. The measuring apparatus according to claim 1, further comprising an illumination section configured to project a light flux onto a measuring area of the object along an object plane which is a plane conjugate with the image plane.

4. The measuring apparatus according to claim 1, wherein the first optical member has a curved-shaped surface which is rotationally symmetric about the first symmetry axis; and
    an inclination direction of the first symmetry axis with respect to the optical axis is opposite to an inclination direction of a normal direction of the image plane with respect to the optical axis.

5. The measuring apparatus according to claim 4, further comprising a second optical member having a curved-shaped surface which is rotationally symmetric about a second symmetry axis; and
    an inclination direction of the second symmetry axis with respect to the optical axis is opposite to the inclination direction of the first symmetry axis with respect to the optical axis.

6. The measuring apparatus according to claim 5, wherein the second optical member has a third portion and a fourth portion in a range in which the image forming light flux passes, the fourth portion being closer than the third portion to an intersection line between a plane including an object plane which is a plane conjugate with the image plane and another plane including the image plane; and
    the second optical member is arranged to be farther away from the image plane than another optical member, of the imaging optical system, in a direction from the fourth portion to the third portion.

7. The measuring apparatus according to claim 5, wherein the second optical member is arranged so that the second optical member cancels a part of aberration generated in the first optical member.

8. The measuring apparatus according to claim 7, wherein the imaging optical system includes three or more optical members including the first and second optical members; and the second optical member is arranged next to the first optical member in a direction in which an image forming light flux travels.

9. The measuring apparatus according to claim 4, wherein the first optical member has a first portion and a second portion in a range in which an image forming light flux passes, the second portion being closer than the first portion to an intersection line between a plane including an object plane which is a plane conjugate with the image plane and another plane including the image plane; and the first optical member is arranged to be closer to the image plane than another optical member, of the imaging optical system, in a direction from the first portion to the second portion.

10. The measuring apparatus according to claim 9, wherein the second optical member is arranged on a same side as the first optical member with respect to an aperture stop between the object plane and the image plane.

11. The measuring apparatus according to claim 1, wherein the imaging optical system includes a plurality of optical members including the first optical member; and the first optical member has an optical surface of which curvature is relatively small among the plurality of optical members.

12. The measuring apparatus according to claim 1, wherein the imaging optical system includes a third optical member having a shape which is rotationally symmetric about the first axis in a range in which an image forming light flux passes.

13. The measuring apparatus according to claim 1, wherein the first optical member has a power with respect to an image forming light flux condensed by the imaging optical system on the image plane.

14. The measuring apparatus according to claim 1, wherein the first optical member has a first plane into which an image forming light flux comes, and a second plane from which the image forming light flux exits; and the second plane is parallel to the first plane.

15. The measuring apparatus according to claim 1, wherein the first optical member has a first plane into which an image forming light flux enters, and a second plane from which the image forming light flux exits; and the second plane is not parallel to the first plane.

16. The measuring apparatus according to claim 1, wherein the transmissive member is arranged to cover a light receiving surface of an imaging element of the imaging section.

17. A profile measuring apparatus which measures a profile of an object to be measured, the apparatus comprising:

the measuring apparatus according to claim 1 configured to take an image of the object irradiated with an illumination light; and a profile information obtaining section configured to obtain information regarding the profile of the object based on a result of measurement by the measuring apparatus.

18. The profile measuring apparatus according to claim 17, further comprising a solid light source configured to radiate the illumination light, including a laser light, onto the object.

19. A structure manufacturing system which manufactures a structure, the system comprising:

a shape forming apparatus which forms the structure based on a design information regarding a profile of the structure;

the profile measuring apparatus as defined in claim 17 configured to measure the profile of the structure formed by the shape forming apparatus; and a controller configured to compare a profile information showing the profile of the structure measured by the measuring apparatus with the design information.

20. A method for manufacturing a structure, the method comprising:

forming the structure based on a design information regarding a profile of the structure;

measuring the profile of the formed structure by the profile measuring apparatus as defined in claim 17; and comparing a profile information showing the profile of the structure measured by the profile measuring apparatus with the design information.

21. An image forming optical system comprising:

a first optical member, and a transmissive member arranged along an image plane and being a flat member, wherein a flat plane, which includes a first axis connecting a point in an object plane and a point in the image plane conjugate with the point in the object plane, and which is perpendicular to an intersection line between a plane including the object plane and another plane including the image plane, and wherein an intersection line between the object plane and the flat plane and an intersection line between the image plane and the flat plane are inclined in mutually opposite directions with respect to the first axis, the first optical member is non-coaxial with respect to the first axis in the flat plane, and the first optical member is inclined in an opposite direction to a direction in which the transmissive member is inclined with respect to the first axis.

22. The image forming optical system according to claim 21, comprising a plurality of optical members including the first optical member;

wherein the first optical member is inclined in the flat plane with respect to the first axis to an extent greater than another optical member included in the plurality of optical members.

23. The image forming optical system according to claim 22, wherein the first axis is an axis connecting a point, in the image plane, which corresponds to a central position in an image forming range by the image forming optical system and a point, in the object plane, which is conjugated with the point in the image plane; and the first optical member is inclined with respect to the first axis in an opposite direction to a direction in which the image plane is inclined with respect to the first axis.

24. The image forming optical system according to claim 23, wherein the first optical member has a curved-shaped surface which is rotationally symmetric about a first symmetry axis; and an inclination direction of the first symmetry axis with respect to the first axis is opposite to an inclination direction of a normal direction of the image plane with respect to the first axis.

25. The image forming optical system according to claim 24, further comprising a second optical member having a curved-shaped surface which is rotationally symmetric about a second symmetry axis; and an inclination direction of the second symmetry axis with respect to the first axis is opposite to the inclination direction of the first symmetry axis with respect to the first axis.

26. The image forming optical system according to claim 25, wherein the second optical member has a third portion and a fourth portion in a range in which the image forming light flux passes, the fourth portion being closer than the third portion to the intersection line between the plane including the object plane and the another plane including the image plane; and the second optical member is arranged to be farther away from the image plane than the another optical member in a direction from the fourth portion to the third portion.

27. The image forming optical system according to claim 25, wherein the second optical member is arranged so that aberration which cancels a part of aberration generated in the first optical member is generated in the second optical member.

28. The image forming optical system according to claim 27, wherein the second optical member is arranged on a same side as the first optical member with respect to an aperture stop between the object plane and the image plane.

29. The image forming optical system according to claim 28, comprising three or more optical members including the first and second optical members;
wherein the second optical member is arranged next to the first optical member in a direction in which an image forming light flux travels.

30. The image forming optical system according to claim 24, wherein the first optical member has a first portion and a second portion in a range in which an image forming light flux passes, the second portion being closer than the first portion to the intersection line between the plane including the object plane and the another plane including the image plane; and
the first optical member is arranged to be closer to the image plane than the another optical member in a direction from the first portion to the second portion.

31. The image forming optical system according claim 21, further comprising a plurality of optical members including the first optical member;
wherein the first optical member has an optical surface of which curvature is relatively small among the plurality of optical members.

32. The image forming optical system according to claim 21, further comprising a third optical member having a shape which is rotationally symmetric about the first axis in a range in which an image forming light flux passes.

33. The image forming optical system according to claim 21, wherein the first optical member has a power with respect to an image forming light flux.

34. The image forming optical system according to claim 21, wherein the first optical member has a first plane into which an image forming light flux enters, and a second plane from which the image forming light flux exits; and
the second plane is parallel to the first plane.

35. The image forming optical system according to claim 21, wherein the first optical member has a first plane into which an image forming light flux enters, and a second plane from which the image forming light flux exits; and
the second plane is not parallel to the first plane.

* * * * *

UNITED STATES PATENT AND TRADEMARK OFFICE
CERTIFICATE OF CORRECTION

PATENT NO. : 9,205,576 B2  
APPLICATION NO. : 13/760745  
DATED : December 8, 2015  
INVENTOR(S) : Daisuke Kitazawa et al.

It is certified that error appears in the above-identified patent and that said Letters Patent is hereby corrected as shown below:

Title page, item 57, lines 5-6, "with respect an optical axis" should read
--with respect to an optical axis--.

Signed and Sealed this  
Fourteenth Day of June, 2016

Michelle K. Lee  
*Director of the United States Patent and Trademark Office*